US006262776B1

(12) United States Patent
Griffits

(10) Patent No.: US 6,262,776 B1
(45) Date of Patent: Jul. 17, 2001

(54) SYSTEM AND METHOD FOR MAINTAINING SYNCHRONIZATION BETWEEN AUDIO AND VIDEO

(75) Inventor: Laurence Kelvin Griffits, Shirley (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/766,326

(22) Filed: Dec. 13, 1996

(51) Int. Cl.[7] ................................................. H04N 9/475
(52) U.S. Cl. ............................................ 348/512; 348/423
(58) Field of Search .................................. 348/512, 513, 348/514, 515, 516, 517, 412, 416, 415, 384, 423, 419, 460–464, 467, 495, 845.1–845.3; 370/503, 516; 386/96, 98, 100, 101, 4, 39, 54; 382/235; 395/551–560, 200.43; H04N 9/475

(56) References Cited

U.S. PATENT DOCUMENTS

| | | | |
|---|---|---|---|
| 5,333,299 | 7/1994 | Koval et al. | 395/550 |
| 5,668,601 | * 9/1997 | Okada et al. | 348/423 |
| 5,715,404 | * 2/1998 | Katseff et al. | 395/200.13 |

FOREIGN PATENT DOCUMENTS

| | | |
|---|---|---|
| WO 94/27233 | 11/1994 | (WO) . |
| WO 94/27235 | 11/1994 | (WO) . |
| WO 94/27236 | 11/1994 | (WO) . |
| WO/94/27234 | 11/1994 | (WO) . |

OTHER PUBLICATIONS

Gibbs, Simon, "Composite Multimedia and Active Objects," *OOPSLA*, pp. 97–112 (1991).
Kjelldahl, L. (ed.), "Multimedia: Systems, Interaction and Applications," 1st Eurographics Workshop, Stockholm, Sweden, Apr. 18–19, 1991, pp. 101–111, Springer–Verlag (1991).

* cited by examiner

*Primary Examiner*—Andrew I. Faile
*Assistant Examiner*—Ronald D. House
(74) *Attorney, Agent, or Firm*—Jones & Askew, LLP

(57) ABSTRACT

A system for playing video data ahead of corresponding audio data in order to help maintain synchronization between the audio data and the video data. Two software objects or filters are used to process the video data. An initial start time of the video data is determined and, if possible, the frame of video data is decoded or else it is selectively dropped in order to help maintain synchronization. An adaptive offset time is applied to the initial start time of a decoded frame of video data in order to produce an adjusted start time for the decoded frame. The offset time can be adapted to include a refresh offset related to sweep delays in computer monitors, a target offset which helps to build in a play-ahead margin for future late frames, and an earliness offset which is diminishing over time to help smooth transitions due to changing apparent video processing power. Additionally, the playing of video data can be slowed down in response to a low condition of the audio buffer. This avoids sound breaks and also helps to maintain synchronization.

22 Claims, 11 Drawing Sheets

SYSTEM AND METHOD FOR MAINTAINING SYNCHRONIZATION BETWEEN AUDIO AND VIDEO

RELATED APPLICATION

This U.S. patent application incorporates pending U.S. patent application Ser. No. 08/766,795, entitled "System and Method for Constructing a Filter Graph to Process Multimedia Data" and filed on Dec. 13, 1996 on behalf of the same inventor. The present application and the incorporated pending U.S. patent application are commonly assigned to Microsoft Corporation.

TECHNICAL FIELD

This invention generally relates to audio and video synchronization and, more particularly described, relates to adaptively playing video data ahead of corresponding audio data while minimizing the amount of dropped video data in order to help maintain audio and video synchronization.

BACKGROUND OF THE INVENTION

The era of silent pictures was ushered out in the early 1900's with the invention of motion pictures with sound. In order to enjoy motion pictures, the video and sound tracks needed to be in synchronization. In other words, when lips are seen to move on the screen and speech is heard, a viewer expects the two to match. In an ideal world, the video and audio match perfectly. However, the world is not ideal and, therefore, we desire to find ways to optimize the synchronization of video and audio in order to meet the viewer's expectations.

Generally, video and audio need to match to an accuracy of not much worse than $\frac{1}{20}$ of a second in order to be acceptable for the viewer. Accuracy better than $\frac{1}{60}$ of a second is nearly impossible on television because new pictures are displayed at that frequency and there is no way to show any movement of the lips until the next new picture. Accuracy worse than $\frac{1}{10}$ of a second is usually noticeable by the viewer and accuracy of worse than $\frac{1}{5}$ of a second is almost always noticeable.

Maintaining synchronization is generally not very difficult when the video data and the audio data are integrated and played using a single video/audio source. For example, a conventional video cassette recorder reads and plays both the video and audio tracks of a tape in a single integrated process. This process maintains synchronization of the video and audio tracks. In other words, when the tape is advanced, the video information is read and displayed on the screen at the same time the audio information is read and played out the speaker. This single sequence paradigm is shattered in the realm of digital video.

In digital video, audio data and video data can be separated and independently decoded, processed, and played. Furthermore, many computer users desire to view digital video while performing some other task or function within the computer, such as sending or receiving information from a computer network. The ability to independently perform these multimedia tasks while simultaneously performing other computer functions can be useful and typically requires a multitasking or multithreaded computing environment.

However, this ability also introduces additional multimedia synchronization problems. In particular, the mere separation of video data and audio data and their independent decoding/processing/playing functions makes it easier to get the video data and the audio data out of synchronization. This is analogous to separating two finely-toothed mechanical gears, independently manipulating each gear, and bringing them back together again in the hope that they will instantly mesh together. Thus, in both the multimedia data processing situation and the mechanical gears situation, one can easily envision problems putting the separated components back together.

Video compression techniques, such as a digital video compression standard established by the Moving Pictures Experts Group (MPEG) under the International Standards Organization (ISO), allow large amounts of multimedia data to be stored within relatively small amounts of memory. This has been extremely useful in efforts to reduce storage and transmission of digital video where storage and bandwidth are a premium. However, the use of such compression techniques requires the multimedia data to be decoded before it can be played. This is often a compute intensive task. Furthermore, in multitasking or multithreaded computing environments, competing processes may steal away processing cycles of the central processor. As a result, the ability to read, decode, process, and play the multimedia data will vary so that the ability to synchronously present the multimedia data to the computer user becomes impaired. In summary, maintaining synchronization of audio data and video data can be problematic.

There are several ways to attempt to solve this problem. The speed of the audio data can be altered to match that of the video data. However, altering the speed of audio is difficult. Most current audio hardware does not support simple alterations in the rate for playing audio. However, existing strategies for altering the audio rate where possible also cause alterations to the sound which are typically unpleasant to the viewer (e.g., wavering alterations in musical pitch, dropping of meaningful consonants or syllables from speech, etc.). For this reason, the audio is generally taken as defining the standard of time and the video is made to keep pace with it.

Another way to solve this problem uses a brute force approach of merely increasing the performance of the hardware. If the computer system has a performance level which is fast enough to keep pace with the compute intensive decoding and playing of both audio data and video data at all times, synchronization of the audio and video can be maintained. Such a powerful computer system can finish decoding the video data and have time left before displaying the decoded video data at a due time synchronous to the due time of the audio data. This merely requires waiting for the right moment before displaying each frame of video data.

A technique of using a common software clock when playing an audio sequence of data synchronized to a video sequence of data can also be used to solve synchronization problems. This technique is the subject matter of PCT Patent Application No. WO 94/27234 entitled, "Multimedia Synchronization System," published on Nov. 24, 1994 (hereinafter the synchronization PCT application). In the synchronization PCT application, time-based audio and video sequences are described as being synchronized together where the video player is synchronized to the audio player. If the audio player speeds up, the video player follows by speeding up in a lockstep fashion.

However, merely using fast computer systems or common software clocks presupposes that the viewer has such a computer system and that there is always enough processing power to service both the audio player and the video player in time so to present synchronous multimedia data to the viewer. In other words, if the computer system is not fast enough or some other competing process grabs the needed processing cycles, the computer system may still have problems maintaining synchronization.

Trying to make the video go smoothly and fast enough is not trivial if the computer system is slow or under-powered, even without competing processes stealing precious compute cycles. Solving synchronization problems with under-powered computer systems has been attempted using inferior decoding methods and by simply dropping frames of video data altogether to maintain synchronization with the audio data. However, these solutions also impose problems for the viewer. When using an inferior decoding method, the video data is generally not completely decoded as a compromise for better performance. This typically results in a blurred or blocky displayed picture, which is less than desirable for the viewer. When merely dropping frames in an attempt to catch up and get back in synchronization with the audio data, the resulting picture viewed on the computer monitor is typically jerky in appearance. Either or both of these techniques are normally preferable to allowing the synchronization of audio and video to continue to drift off. However, the viewer is still stuck with either blurred video, a jerky appearance of the video, or both.

Additionally, where it takes a significant effort to decode the audio data, it is necessary to ensure that enough processor time is devoted to this audio process in the overall multimedia playing scheme in order to avoid audio breaks. Generally, the audio is decoded some time in advance so that there is typically a few seconds of buffered decoded audio data within an audio buffer ready to be played by the sound system within the computer. If no further audio data is decoded for this length of time, then eventually the sound system runs out of decoded audio data in the buffer. As a result, the sound stops abruptly, right in the middle of wherever was playing, usually with a slight click or pop. When decoded audio data becomes available again within the audio buffer, the sound system resumes playing, again usually with a pop. Such pops and silences are intrusive, undesirable, and very unpleasant to the viewer.

Therefore, there is a need for a system for maintaining the synchronization between audio and video data (1) while degrading the presented video as little as possible, (2) while avoiding breaks in the audio, (3) while minimizing the amount of dropped video frames, and (4) that is adaptive to the apparent processing power of the system while avoiding jerky video appearances when adapting to the apparent processing power of the system.

SUMMARY OF THE PRESENT INVENTION

The present invention satisfies the above-described needs by providing a system and method for playing video data ahead of corresponding audio data in order help maintain synchronization between the audio data and the video data. The audio data and the video data are typically time-stamped to correspond with each other. The time-stamping includes a start or due time for the data. Typically, the video data comprises a sequence of frames corresponding to samples of the audio. Ideally, frames of video data area played at the same due time as the corresponding audio data so that the audio and video are exactly synchronized. However, video processing can be altered, generally by adjusting when each frame is played relative to the audio data, selectively dropping frames, and slowing video processing when the audio buffer is low, in order to help maintain this synchronization, as described below.

In general, the present invention provides a method where the initial due time of the video data is determined. This initial due time is typically the time-stamped initial start time for the video data indicating when the video data should be played. As mentioned above, this due time is the same as the time when the corresponding audio data should be played. Next, an offset time is applied to the initial video due time. This offset time adjusts when the video data should be played relative to the corresponding audio data and produces an adjusted video due time earlier than the initial video due time. In one embodiment of the present invention, the video due time is adjusted so that the video can be played ahead of the audio only if the previous video data was played late.

The value of the offset time is typically adapted in various situations. In one aspect of the present invention, the offset time is initially set to a value where the video and the corresponding audio appear substantially synchronous to a viewer (i.e., the out-of-synchronization time difference is not yet noticeable to the viewer) when the video is played at the adjusted video due time ahead of the corresponding audio. Typically, this offset time is less than 50 milliseconds, and, more particularly, is approximately 30 milliseconds. This is advantageous because it permits video to be played ahead of the audio in order to build in a margin for any future late frames while degrading the video as little as possible.

In another aspect of the present invention, the offset time includes time corresponding to a delay when waiting for a screen display on a computer monitor to be updated. This generally is less than 20 milliseconds, and, more particularly, is approximately 8 milliseconds.

In yet another aspect of the present invention, the offset time is set to a diminishing value if the system is transitioning from a slow machine mode to a fast machine mode of playing and synchronizing the video data to the corresponding audio data. The slow machine mode is basically where prior frames of the video data are played later than the corresponding audio data or are omitted. Omitting frames is normally called "dropping" frames. The fast mode is basically where the prior frames of video data are played ahead of the corresponding audio data. During the transition between these two modes, the offset time diminishes in value in order to adapt to the apparent change in processing power of the system. This advantageously avoids playing video data that appears jerky when adapting or transitioning from the slow mode to the fast mode.

Finally, the video data is played at the adjusted due time. In this manner, the video data is advantageously played ahead of the corresponding audio data and helps to maintain overall synchronization between the audio data and the video data.

In combination with playing video ahead of audio, frames of the video data can be selectively dropped in order to help maintain audio and video synchronization. A frame is typically dropped if it is deemed to be damaging. Generally, a frame is damaging if it will take longer than a predetermined period of time to decode. This predetermined period of time is typically the average time between independent frames of the video data. Additionally, a frame is damaging if actually playing the frame, even though the frame has already been decoded, will not help maintain the synchronization between the video data and the corresponding audio data, but will make the synchronization worse, beyond predetermined limits. In this manner, the amount of dropped frames of video is advantageously minimized while helping to maintain synchronization between the audio and the video.

Another aspect of the present invention provides a method for signaling between an audio object and a video object in order to help maintain synchronization between the audio object and the video object. Essentially the audio object and the video object are software modules used when processing multimedia data, such as the audio data and the video data. First, the video data is played by the video object. Next, the video object determines if a message signal was sent from the audio object to the video object. This message signal indicates that an audio buffer is in a predetermined condition, typically a condition indicating the level of buffered audio data in the audio buffer is low.

If this message signal was sent from the audio object, the video object waits for a predefined period of time in order allow the audio object to fill the audio buffer with more audio data. Typically, the value of the predefined period of time depends on how low the level of buffered audio data is within the audio buffer. Typically, if the amount of buffered audio data left is approximately half of the capacity of the audio buffer, the predefined period of time is approximately 25 milliseconds. If the amount of buffered audio data left is approximately a quarter of the capacity of the audio buffer, the predefined period of time is approximately 100 milliseconds. If the audio buffer is nearly empty, the predefined period of time is approximately 200 milliseconds. In this manner, synchronization between the audio object and the video object is advantageously enhanced by avoiding breaks in the audio.

The present invention and its advantages, those described above and otherwise, will be appreciated from studying the following detailed description and drawings, and the appended claims.

DETAILED DESCRIPTION OF THE PREFERRED EMBODIMENT

Figure 1:
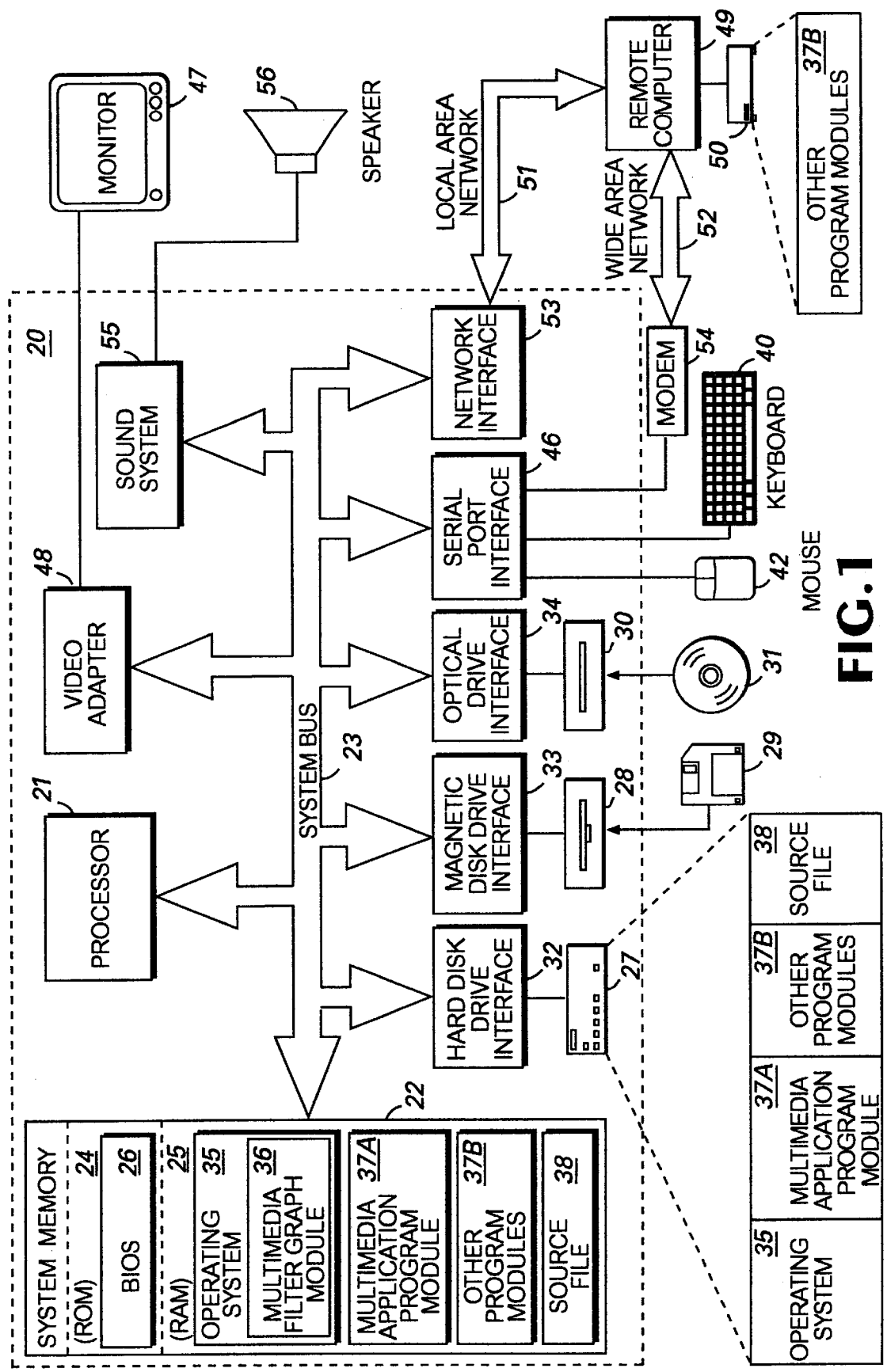
FIG. 1 is a block diagram of a personal computer that provides the operating environment for the preferred embodiment of the present invention.

The present invention is directed to a system for adaptively playing video data ahead of corresponding audio data while minimizing the amount of dropped video data in order to help maintain audio and video synchronization. The video data can be played ahead of the corresponding audio data by a variable offset of time. This offset of time is adapted depending on how early or how late the frame of video data is relative to the corresponding audio. Furthermore, the offset can be a diminishing offset that smoothes the transition from when frames of video data are played later than the corresponding audio (a slow machine mode) to when frames of video data are produced early (a fast machine mode). The audio process is able to independently signal the video decoding process to slow down if the audio buffer is getting low in an effort to avoid sound breaks while still helping to maintain synchronization. The preferred embodiment of the present invention is represented by a multimedia filter graph module provided as part of an "ACTIVEMOVIE" Software Development Kit, which supports multimedia data control and processing within the "WINDOWS NT" and "WINDOWS 95" operating systems developed by Microsoft Corporation of Redmond, Wash.

Briefly described, the multimedia filter graph module (MFG module) allows users to play multimedia data, such as digital movies encoded using the MPEG digital video compression standard. In general, the MFG module defines how streams of time-stamped multimedia data (audio and video data) are controlled and processed by using modular software components, preferably called "filters." A "filter" is essentially a multimedia object capable of performing some kind of process on multimedia data, such as reading audio data and video data from an MPEG-encoded source file or splitting the audio data and the video data into distinct bitstreams of compressed data. Different filters are used for different functions and for different formats of multimedia data, such as the QuickTime format for digital movies established by Apple Computer of Cupertino, Calif.

Filters are typically connected together into particular arrangements, preferably called "filter graphs." A "filter graph" is similar to nodes linked together in such a way as to perform a certain function. The filters within the filter graph would be connected such that the output of one filter typically becomes the input for the next filter. In this manner, a stream of multimedia data can be read, split apart, decoded, and rendered or played by different filter software modules connected into a filter graph.

The MFG module controls how a filter graph is built and how the multimedia data is moved and processed through the individual software filter modules that make up of the filter graph. The MFG module also provides an interface between a multimedia application program and the filter graph used to process the multimedia data. Applications can make direct calls to individual software filters via calls to interfaces supported by the MFG module.

Digital movie information is generally processed by the MFG module by reading the multimedia data, separating the data into distinct audio and video streams, decoding these streams, and synchronously rendering these streams into buffers. Once within the buffers, the audio and video are played by the associated multimedia hardware. In general, a video decoder filter decodes the encoded video data stream, frame-by-frame, and a video renderer filter sequentially plays each decoded frame of video data at the appropriate time.

In particular, the video decoder typically predicts how late a frame will before it is decoded. The frame is decoded and sent "downstream" to the video renderer if the prediction indicates the frame should be decoded within enough time to play it and based on other timing statistics. In some situations, certain less important types of video frames are dropped until a more important type of video frame is encountered. In other situations that depend on the predicted lateness, the next frame is dropped no matter what type it is because the frames of video data are running too far behind and the decoder needs to catch up. In this manner, the decoder attempts to make an intelligent decision on whether to drop the next frame of video data in order to help maintain synchronization.

The video renderer filter is responsible for reporting to the video decoder how late the current frame is and for playing the frame of video, if possible, using various timing offsets in order to help maintain synchronization with the audio data. In summary, the video performance and synchronization to the audio is adjusted and adapted by these two software object or modules (filters) by adaptively applying various timing offsets alone and in combination with selectively dropping frames of video data. The ability to adaptively help to synchronize the video to the audio is the focus of the present invention.

The detailed description which follows is represented largely in terms of processes and symbolic representations of operations by conventional computer. The processes and operations performed by the computer include the manipulation of signals by a processor and the maintenance of these signals within data sets or data structures resident in one or more memory storage devices. These symbolic representations are the means used by those skilled in the art of computer programming and computer construction to most effectively convey teachings and discoveries to others skilled in the art. For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, symbols, nodes, frames, samples, data, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as creating, adding, comparing, dropping, receiving, determining, applying, storing, selecting, playing, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include routines, programs, components, objects, filters, data structures, etc., that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from a CD-ROM disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above includes the hard disk drive 27, a removable magnetic disk 29 and an optical disk 31, such as a CD, it should be appreciated by those skilled in the art that other types of media which are readable by a computer, such as magnetic cassettes, flash memory cards, digital video disks and tapes, Bernoulli cartridges, and the like, may also be used in the exemplary operating environment.

A number of program modules may be stored in the drives and RAM 25, such as an operating system 35 having a multimedia filter graph module 36 (MFG module). As previous described, the preferred MFG module 36 defines how streams of time-stamped multimedia data (audio data and video data) are controlled and processed using modular software components. Other program modules may be stored in the drives and in RAM 25, including one or more application programs (such as a multimedia application program module 37a), other program modules 37b, and program data (such as a source file 38 containing multimedia data).

The operating system 35 (and its MFG module 36), in conjunction with the BIOS 26 and associated device drivers, provides the basic interface between the computer's hardware and software resources, the user, and program modules such as the multimedia application program module 37a. A user may enter commands and information into the personal computer 20 through a keyboard 40 and an input or pointing device, such as a mouse 42. Other input devices (not shown) may include a microphone, a joystick, a game pad, a satellite dish, a scanner, or the like. These and other input devices are often connected to the processor 21 through a serial port interface 46, such as a game port or a universal serial bus (USB). A monitor 47 or other type of display device is also connected to the system bus 23 via an interface, such as a video adapter 48. One or more speakers 56 are also connected to the system bus 23 via an interface, such as a sound system 55. In addition to the monitor 47 and speaker 56, personal computers typically include other peripheral output devices (not shown), such as printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections show are exemplary and other means of establishing a communications link between the personal computer 20 and the remote computer 49 may be used.

As discussed earlier, the preferred embodiment of the present invention is embodied in the preferred MFG module 36, which supports multimedia data control and processing within Microsoft Corporation's "WINDOWS 95" or "WINDOWS NT" operating systems. However, it should be understood that the invention can be implemented for use with other operating systems, such as Microsoft Corporation's "WINDOWS 3.1" operating system, IBM Corporation's "OS/2" and "AIX" operating systems, SunSoft's "SOLARIS" operating system used in workstations manufactured by Sun Microsystem, Hewlett-Packard's "HP-UX" and "RT-UX" operating systems, and the operating system used in "MACINTOSH" computers manufactured by Apple Computer, Inc.

From this brief description, it should be appreciated that operating systems, such as the "WINDOWS 95" and "WINDOWS NT" operating system, are quite complex and provide a wide variety of services that allow users and programs to utilize the resources available in the personal computer. Those skilled in the art will be familiar with operating systems and their various features. For more comprehensive information regarding the "WINDOWS 95" and "WINDOWS NT" operating system and its interaction with programs, the reader may refer to any of a variety of publications, including the "Win32 Programmer's Reference" and "Advanced Windows", both published by Microsoft Press.

Likewise, those skilled in the art will appreciate that the preferred MFG module 36 provides a wide variety of features and functions in addition to those included in the brief description presented above.

Multimedia Data Formats

The MFG module 36 is capable of processing and playing multimedia data stored in a variety of multimedia formats, such as MPEG, QuickTime Run-Length-Encoding, Cinepak or raw (uncompressed) data. As previously mentioned, an exemplary digital video compression format compatible with the MFG module 36 is the standard established by the Moving Pictures Experts Group (MPEG) under the International Standards Organization (ISO). The preferred embodiment of the present invention manipulates multimedia data stored in the MPEG format. However, the principles of the present invention apply to processes that manipulate other formats of time-stamped multimedia data.

MPEG encoding of digital video data allows a large amount of audio and video data to be compressed and stored within a relatively small amount of memory. The MPEG encoding scheme is based upon predictive coding. Basically, predictive coding determines the difference between a current pixel displayed on the monitor and a prediction of that pixel based on the prior condition of the pixel. However, in the MPEG standard, the coding is in the form of a block-based, motion compensated prediction (MCP) technique that is an extension of basic predictive coding. This MCP technique accounts for the frame-to-frame displacement of moving objects during a video sequence on a block basis (i.e., a predefined region of the screen) instead of on a pixel-to-pixel basis. In this manner, a frame of video data is defined in terms of a number of blocks.

Additionally, there are several different types of frames within a given digital video compression standard, such as MPEG. One type of frame can be decoded without any prior history. This type of self-contained or independent frame (I-frame) is typically called an "intra-coded" frame in the MPEG format. In AVI, another digital video compression standard encoding format, these I-frames are referred to as "key frames."

Another type of frame is a predicted frame, generally called a P-frame. The P-frame requires a previous I-frame or previous P-frame to decode them. This is because the P-frame expresses the frame of video data as a change from the previous one. In this manner, the P-frame typically stores the frame of video data in less memory space and is faster to decode than I-frames.

A third type of frame is generally called a B-frame. The B-frame requires the previous I-frame or P-frame and a following I-frame or P-frame. Typically, the B-frame requires even less memory space than P-frames and is also faster to decode than I-frames. No frame requires a B-frame (other than itself) to decode it. This means that any B-frame can be dropped without upsetting the future decoding of the digital video.

Thus, the video data is basically a sequence of frames of video data. If any I-frame or P-frame in the sequence is not decoded, nothing further can be decoded until the next I-frame is reached in the sequence. I-frames generally take the longest to decode with B-frames taking the least of the three frame types to decode. In an example digital movie, a video frame sequence may have a pattern of one I-frame to 4 P-frames, and 2 B-frames after each I-frame or P-frame. This frame sequence would appear as |I|B|B|P|B|B|P|B|B|P|B|B|P|B|, etc. By dropping all the B-frames (66% of the frames), only a small fraction of the overall decoding and playing time is saved because of the relatively small time needed to decode the B-frames. While dropping I-frames would help reduce decoding times overall for a video sequence, it has the effect of making the video choppy and generally undesirable. Thus, dropping I-frames is avoided if at all possible.

Figure 2:
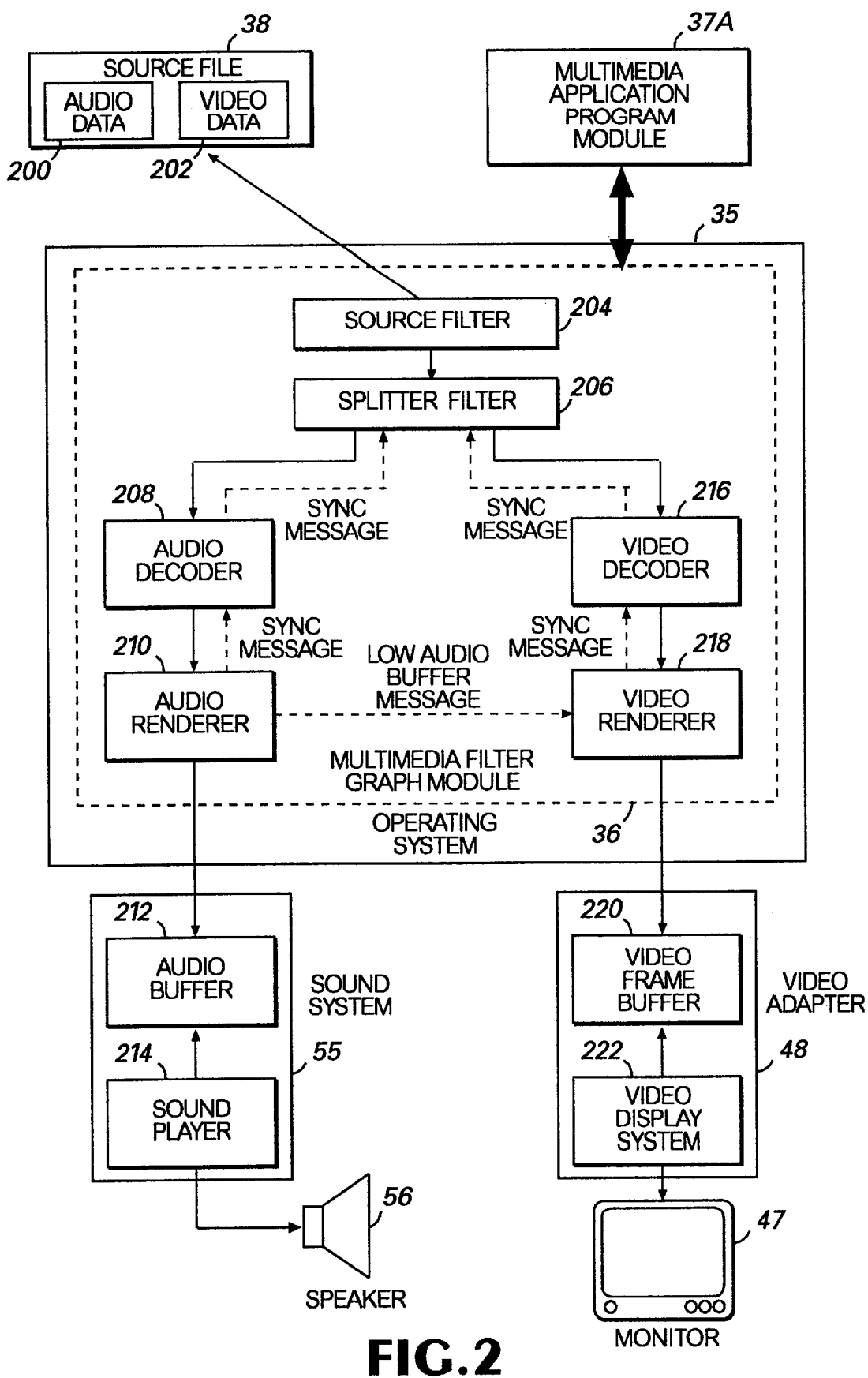
FIG. 2 is a diagram illustrating the multimedia filter graph module and its relationship with a source file, a multimedia application program module, and specific multimedia hardware.
Figure 10:
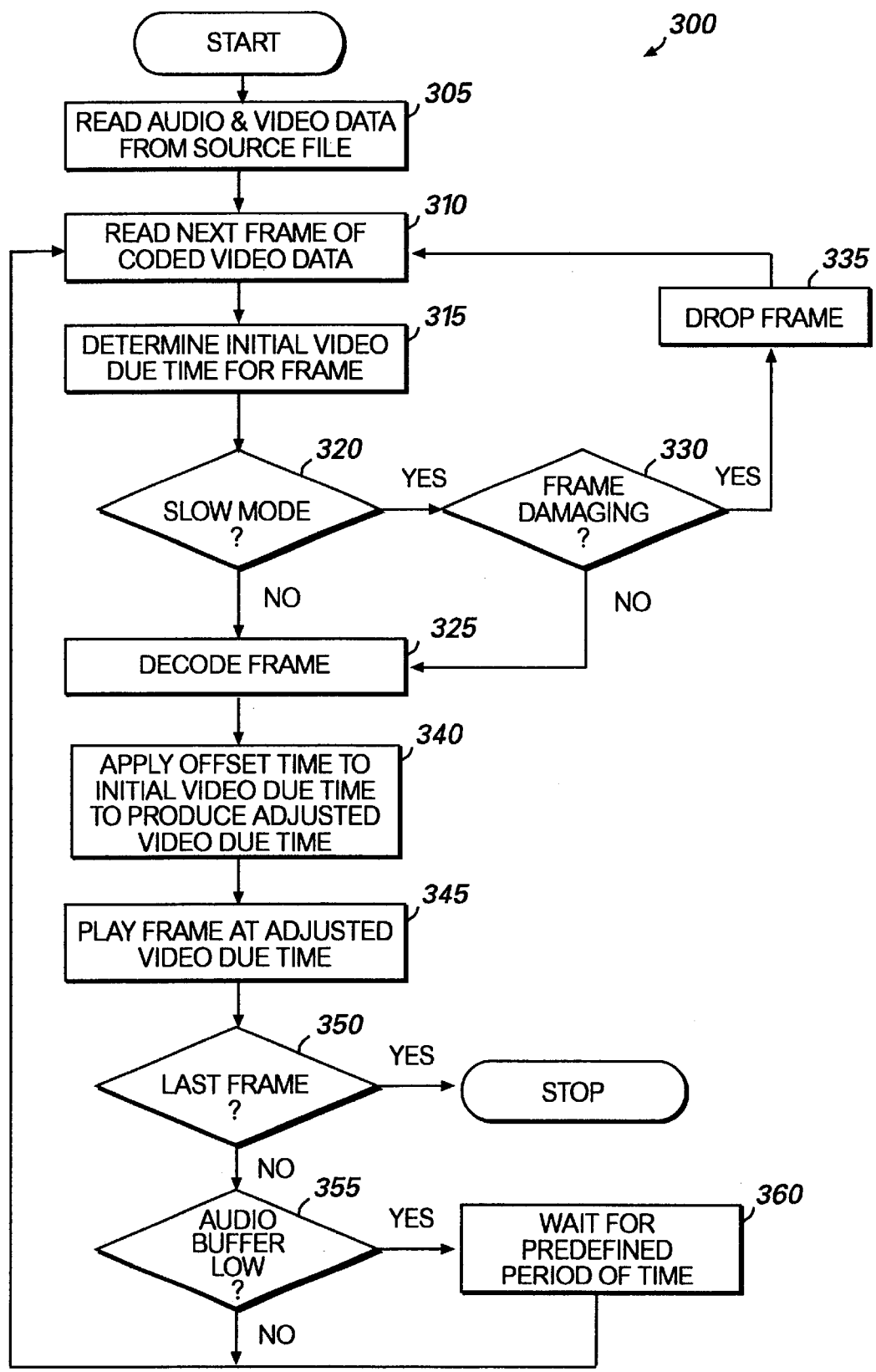
FIG. 10 is a flow diagram illustrating steps from the preferred method for playing video data ahead of corresponding audio data in order to help maintain synchronization.
Figure 11:
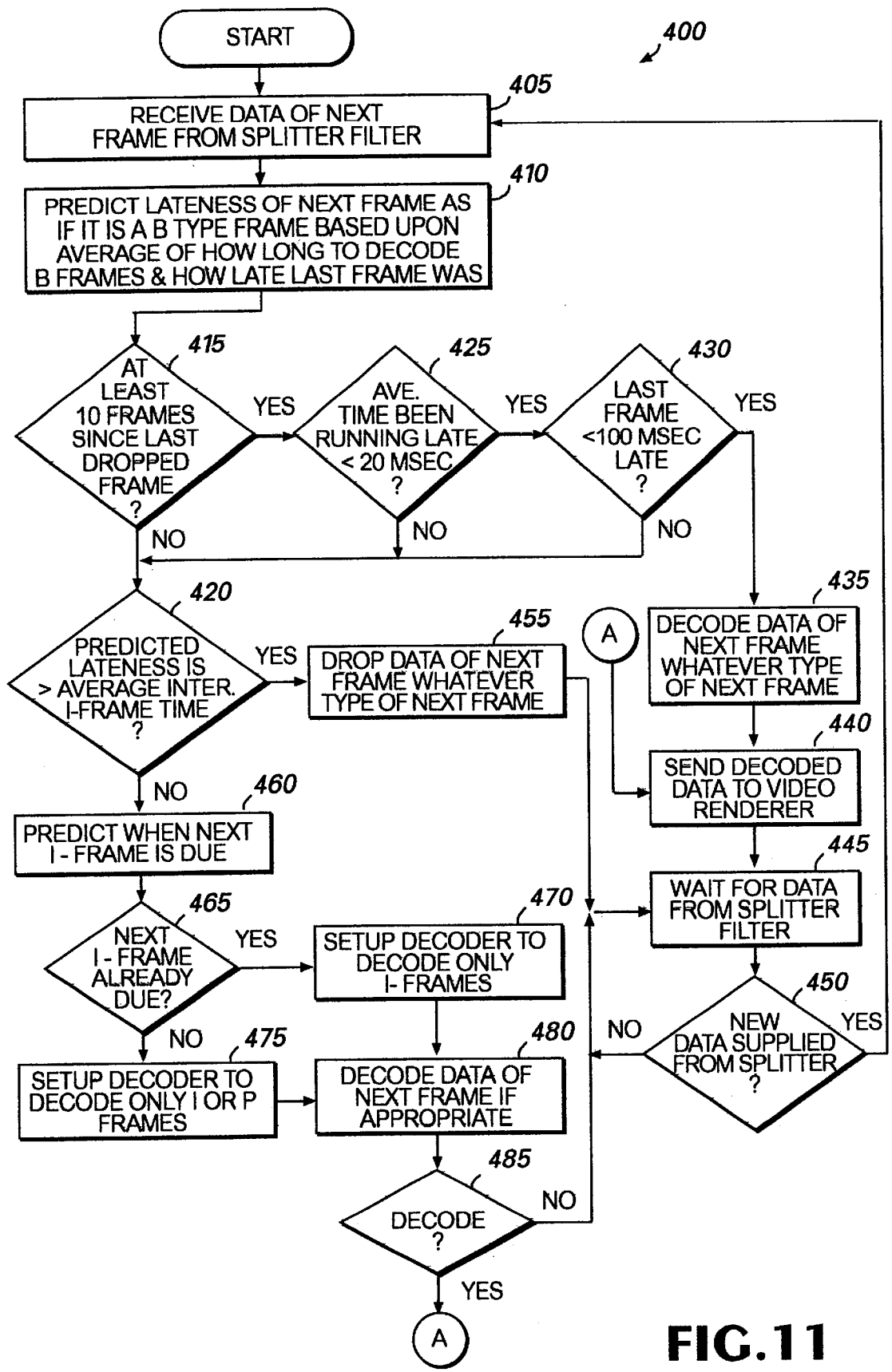
FIG. 11 is a detailed flow diagram illustrating steps from the preferred method for processing video data within a video decoder module in order to help maintain audio and video synchronization.

Given the above preface on the operating environment, multimedia data formats, and MPEG in general, the preferred embodiment of the present invention is described below. FIG. 2 describes the relationship between a source file, a multimedia filter graph module, a multimedia application program module, and specific multimedia hardware. FIGS. 3–9 are illustrations of an exemplary sequence of video frames. FIGS. 10–12 are flow diagrams illustrating the preferred embodiment of the present invention.

The Multimedia Filter Graph Module

As previously mentioned, the MFG module 36 is a program module within the operating system 35 that controls and processes multimedia data. FIG. 2 is a diagram illustrating the MFG module 36 and its relationship with the source file 38, the multimedia application program module 37a, and specific multimedia hardware.

Referring now to FIGS. 1 and 2, the MFG module 36 contains other software objects or modules, preferably called filters, capable of processing multimedia data. As previously mentioned, the MFG module 36 defines how streams of time-stamped multimedia data (such as audio data 200 and video data 202) are controlled and processed using such filters. While the MFG module 36 has many different filters, several exemplary filters are illustrated in FIG. 2 for processing the audio data 200 and the video data 202 from the source file 38.

One of the exemplary filters is a source filter 204. The source filter 204 is responsible for reading the encoded bitstream of multimedia data (i.e., the audio data 200 and the video data 202) from storage, such as the source file 38. The audio data 200 and the video data 202 are each essentially time-stamped encoded multimedia information, preferably using the MPEG format. The source filter 204 then routes the encoded bitstream to a splitter filter 206.

The splitter filter 206 is activated when the source filter "pushes" the encoded bitstream into the splitter filter 206. The splitter filter 206 then processes the encoded bitstream by separating it into the respective encoded bitstreams of the audio data 200 and the video data 202. After separating the encoded bitstream, the splitter filter 206 sends the encoded bitstream of audio data 200 to an audio decoder filter 208 while the encoded bitstream of video data 202 is sent to a video decoder filter 216.

The manner of waiting for data to process and having the data presented to the filter, thus prompting the filter to process the data and send it further downstream, is called a "push model" for information processing. In a software implementation where the upstream module invokes the downstream module as a subroutine call supplying data, the implementation is referred to as the "push" model. Where the downstream module invokes the upstream module as a subroutine call to request data it is referred to as a "pull" model. In the preferred embodiment, the filters within the MFG module 36 conform to this "push" model for information processing.

On the audio side, the audio decoder filter 208 essentially decodes the audio data 200 and sends it downstream to an audio renderer filter 210. The decoded audio data 200 is time-stamped with a start time or "due" time, which is when that particular sample of audio data 200 should be played by the audio renderer filter 210. The decoded audio data 200 is played into an audio buffer 212, typically a direct memory access (DMA) buffer within the sound system 55 of the computer 20, at the appropriate due time for the data. In the preferred embodiment, the sound system 55 continuously reads the audio buffer 212 in a loop where the audio renderer 210 can be writing audio data 200 into part of the audio buffer 212 while the sound system 55 is reading another part of the audio buffer 212. In this manner, the hardware within the sound system 55, such as a sound player hardware 214, seemlessly sounds the audio data 200 into the speaker 56 while the audio buffer 212 is repeatedly being refilled.

While the audio data 200 is being processed and played at its audio due time, the video side is simultaneously busy trying to decode and render frames of video data 202 fast enough to keep up with the played audio data 200. In particular, the video decoder 216 receives the encoded bitstream of video data 202 from the splitter filter 206 and basically decides whether to decode the next frame of video data 202 and send it on to a video renderer filter 218 or to drop the next frame of video data 202 before decoding it. By dropping the next frame of video data 202, time is saved in order to help maintain synchronization with the audio data 200 being played, though a jerk in the video is inevitably introduced.

In the preferred embodiment, the video decoder filter 216 is able to make such decisions (i.e., drop the frame or decode the frame) based upon messages or signals, preferably called quality messages, being sent from the video renderer filter 218 "downstream" of the video decoder 216. Essentially, the video renderer filter 218 asynchronously notifies the video decoder filter 216 of how late the last frame was played. This lateness report is used by the video decoder filter 216 when deciding if the next frame should be dropped before spending the time to decode the next frame. These decisions are also based on how long it has been since the last I-frame was played. In summary, the video decoder filter 216 is responsible for making a first attempt at helping to maintain synchronization by either decoding the next frame or dropping the next frame.

Once the video data 202 has been decoded by the video decoder filter 216 and sent to the video renderer filter 218, the video renderer filter 218 also helps to maintain synchronization with the played audio data 200 by adjusting the start or due time of the frame of video data 202 by a particular offset time. Basically, this allows the video renderer filter to play video data 202 ahead of the its initial due time by predetermined amounts of time while still appearing to the viewer to be in synchronization with the played audio data. For example, the video data 202 may be played approximately 30 milliseconds ahead of when it is initially due to be played in synchronization with the audio data 200. The viewer is not able to visually detect any loss of synchronization because typically any difference between the audio and video of up to about 50 milliseconds is not generally detectable by viewers. Playing the video ahead is helpful because there are many things that can make the video late (such as when a high priority competing process steals computing cycles needed to complete the decoding and playing of a frame of video data 202), but there are no random effects that make the video play early. Thus, playing the video ahead of the audio as much as possible without having the viewer detect a loss of synchronization is advantageous because it essentially helps to build a margin for "lateness" error when decoding and playing future frames of video data 202.

In another example, the offset is set to compensate for the delay in displaying the frame of video data due to the refresh rate of the computer monitor 47. Monitors, such as the computer monitor 47 on the personal computer 20, typically have a refresh rate of between 50 and 72 sweeps per second. There is a delay where no new information is placed on the screen of the monitor 47 due to the need to reposition the scanning electron beam within the monitor 47. The screen is typically swept or painted from top to bottom along conventional resolution lines across the monitor 47. At the bottom of the screen, after the last line of resolution is painted, the electron beam is turned off so as not to excite pixels on the screen while the electron beam is repositioned to begin the next sweep of the monitor 47 from the top. Therefore, once the video has been decoded and the video is ready to be drawn, it cannot in fact be drawn on the screen of the monitor 47 until the next sweep.

This generally introduces a random delay on a 50 Hertz monitor of approximately 0 to 20 milliseconds and a delay of approximately 0 to 14 milliseconds on a 72 hertz monitor. This delay occurs after everything else has been done and is generally not sensed by the software. By aiming to play the video early by about half of this delay, preferably using an offset of approximately 8 milliseconds, the next frame of video data is allowed to be played into a video frame buffer 220 during this delay. In this manner, the video renderer 218 can make up time due to any previously late video frames or further bolster the "lateness" margin of error against future late frames of video data 202. Those skilled in the art will understand the principles of the different scanning modes (interlaced and non-interlaced) for updating or refreshing the screen display on the monitor 47 and the inherent delay incurred when repositioning the electron beam within the monitor 47.

If the video renderer filter 218 has been late playing video frames and now is able to play future frames early, the offset time can be adaptively set or updated to a diminishing value. A quick and abrupt adjustment to the video due time for the current frame to make up for past late frames may seem like the proper thing to do. However, doing so incurs an abrupt change from the viewer's perspective. Therefore, it is more advantageous to smooth the transition from when the frames are being played late back to when the frames are being played on time and in synchronization with the audio data 200. This transition is best explained in stages and by reference to FIGS. 3–9.

Figure 3:
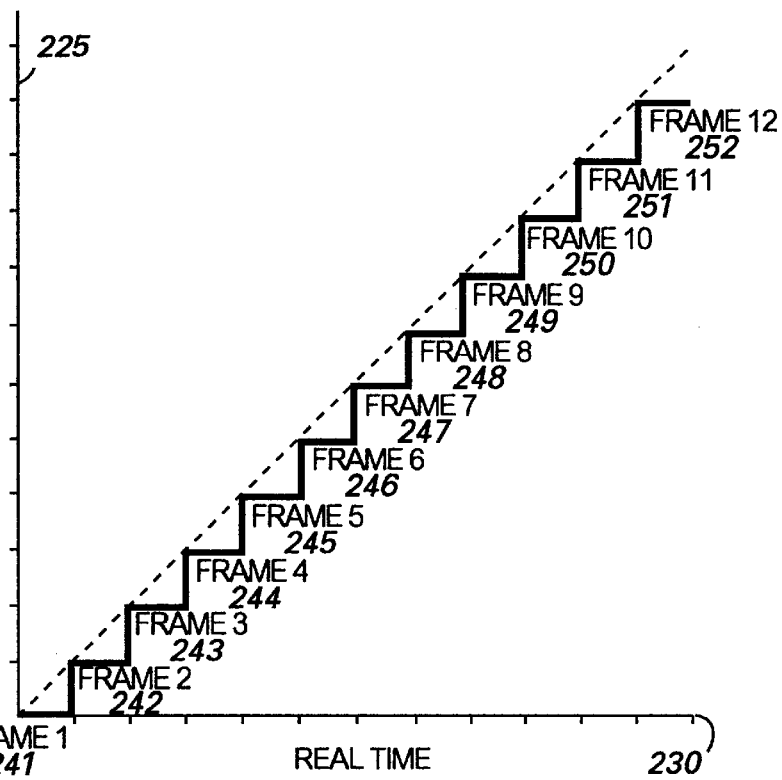
FIG. 3 is a diagram illustrating perfect synchronization between the audio and video where frames of video are played exactly on time.

FIG. 3 is a diagram illustrating perfect synchronization between the audio and video where frames of video are played exactly on time. Referring now to FIG. 3, a pair of axes are illustrated. The vertical axis 225 is the video due time for a sequence of frames 241–252 of video data 202. Each notch in the vertical axis 225 denotes the due time for a single frame of video data 202, which is supposed to coincide with the due time for a sample of audio data 200. The horizontal axis 230 is a timeline of the actual or real time used to decode and play each frame of video data 202 in the sequence. For example, if the frames of video data 202 (e.g., frame 1 241, frame 2 242, frame 3 243, etc.) are decoded and played exactly at their respective due time, the frames 241–252 are said to be in perfect synchronization with the audio data 200. This is the ideal situation with a computer system 20 having an ideal amount of processing power to maintain synchronization between the audio and video.

Figure 4:
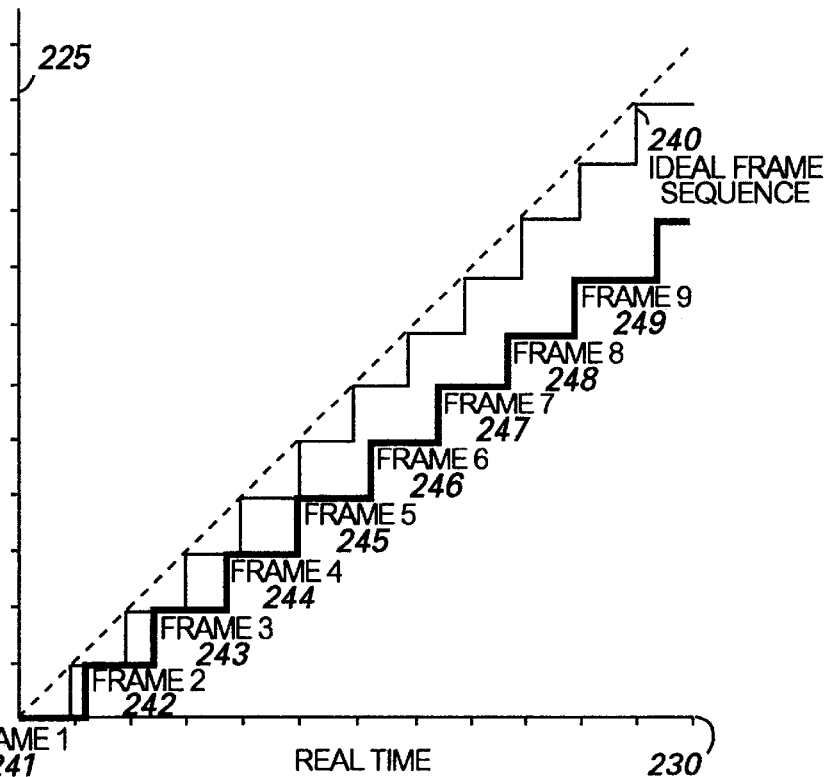
FIG. 4 is a diagram illustrating how frames of video are played late because of a slow computer with inadequate processing power.

FIG. 4 is a diagram illustrating how frames of video data 202 are played late because of a slow computer with inadequate processing power. Referring now to FIGS. 3 and 4, the slow computer is not able to decode and play each frame of video in time to make the respective video due time. Accordingly, the frames 241–252 in FIG. 4 begin to run more and more later than an ideal frame sequence 240 (such as the perfectly synchronized frames 241–252 illustrated in FIG. 3) and synchronization between the audio and video is lost.

Figure 5:
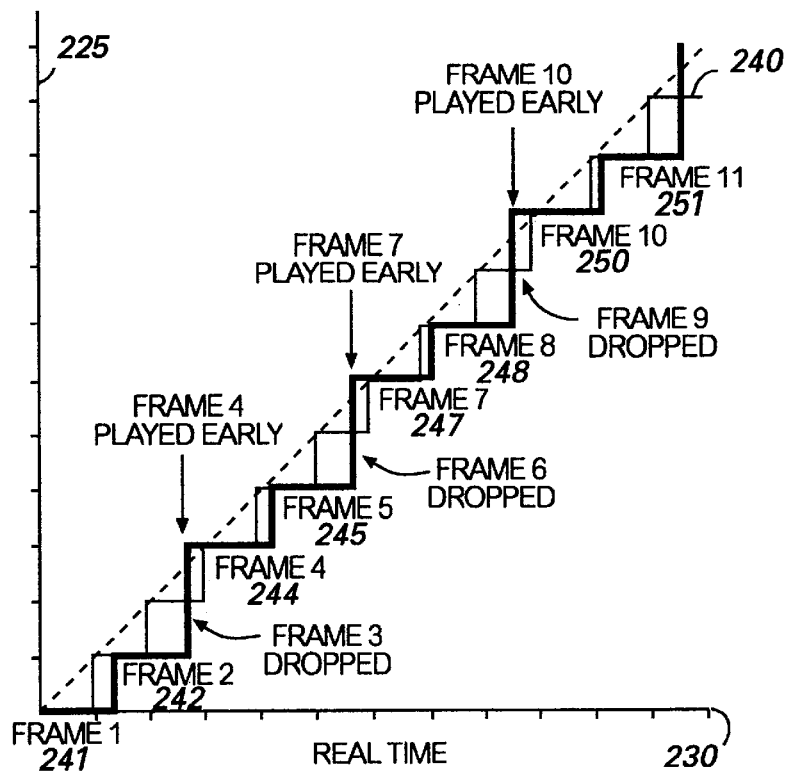
FIG. 5 is a diagram illustrating how frames of video can be dropped on a slow computer with inadequate processing power in order to help maintain synchronization.

FIG. 5 is a diagram illustrating how frames of video data 202 can be dropped on a slow computer with inadequate processing power in order to help maintain synchronization. Referring now to FIGS. 3–5, frame 1 241 and frame 2 242 are each played later than their respective due times. At this point, it would be less damaging to the synchronization of audio and video to drop frame 3 243 rather than to play it. Furthermore, synchronization can be helped by playing frame 4 244 immediately instead of waiting for the normal due time associated with frame 4 244. After frame 4 244, additional frames are played until the lateness of playing a frame (such as frame 5 245) is such that the next frame should be dropped (such as frame 6 246). Dropping some frames introduces some abrupt changes in the video sequence. However, selectively dropping frames of video data 202 is preferable to losing synchronization.

Figure 6:
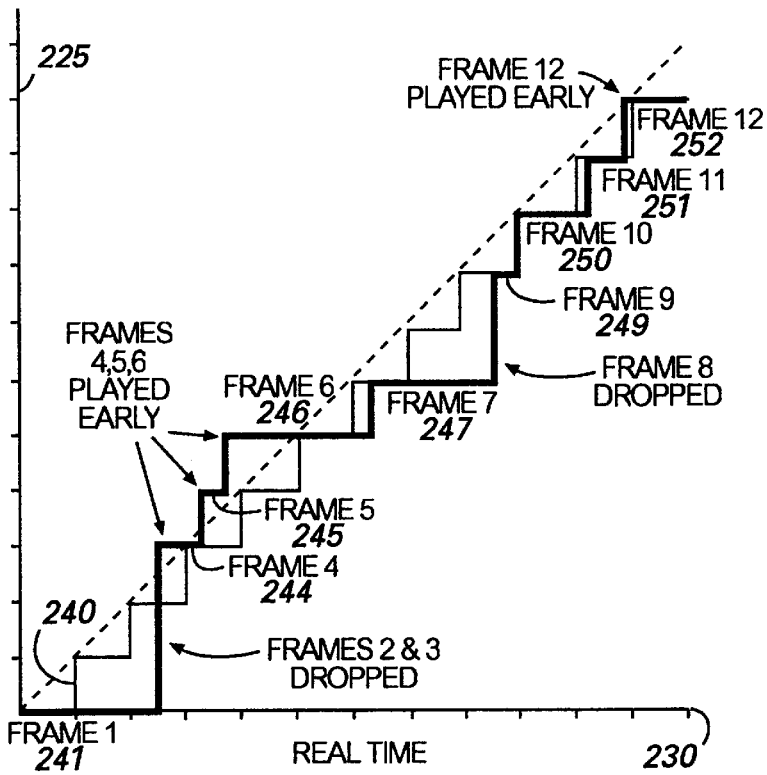
FIG. 6 is a diagram illustrating how frames of video with irregular processing times can be dropped and played early in order to help maintain synchronization.

FIG. 6 is a diagram illustrating how frames of video with irregular processing times can be dropped and played early in order to help maintain synchronization. Referring now to FIGS. 3–6, frame 6 246 is decoded and played well ahead of its due time, but the frame 7 247 is still decoded and played late. Allowing frames of video data 202 to be played early as well as late allows more frames to be played and gives a less jerky or abrupt appearance to the viewer. Furthermore, playing frames early and late also keeps the overall synchronization of the sequence of frames 241–253 closer to the ideal frame sequence 240. For example, synchronization problems are less noticeable to the viewer by allowing the frames 241–253 to run 50 milliseconds early and 50 milliseconds late, as opposed to never running early and potentially running 100 milliseconds late (a more noticeable loss of synchronization).

Figure 7:
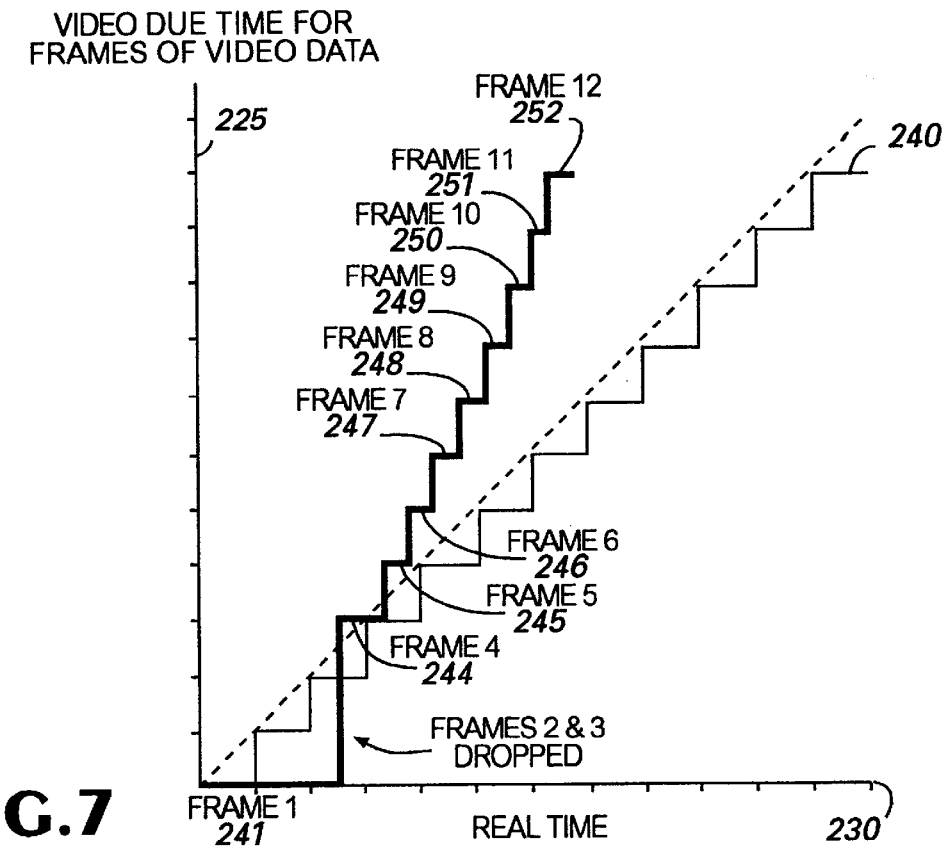
FIG. 7 is a diagram illustrating how frames of video may be processed on a slow computer that begins to run faster.

FIG. 7 is a diagram illustrating how frames of video may be processed on an apparently slow computer that begins to run faster. Referring now to FIGS. 3–7, the computer 20 may begin to run faster or at least appear to run faster if it has fewer other processes to simultaneously handle. In this situation, frames of video data 202 were being processed late (such as frame 1 241). Once the computer 20 is able to process frames faster, it decodes and plays them earlier and earlier. For example, frame 2 242 and frame 3 243 are dropped after frame 1 241 because the computer 20 was apparently slow when processing frame 1 241. However, once frame 4 244 is played earlier than its due time, subsequent frames 245–252 are played increasingly early and synchronization is lost.

Figure 8:
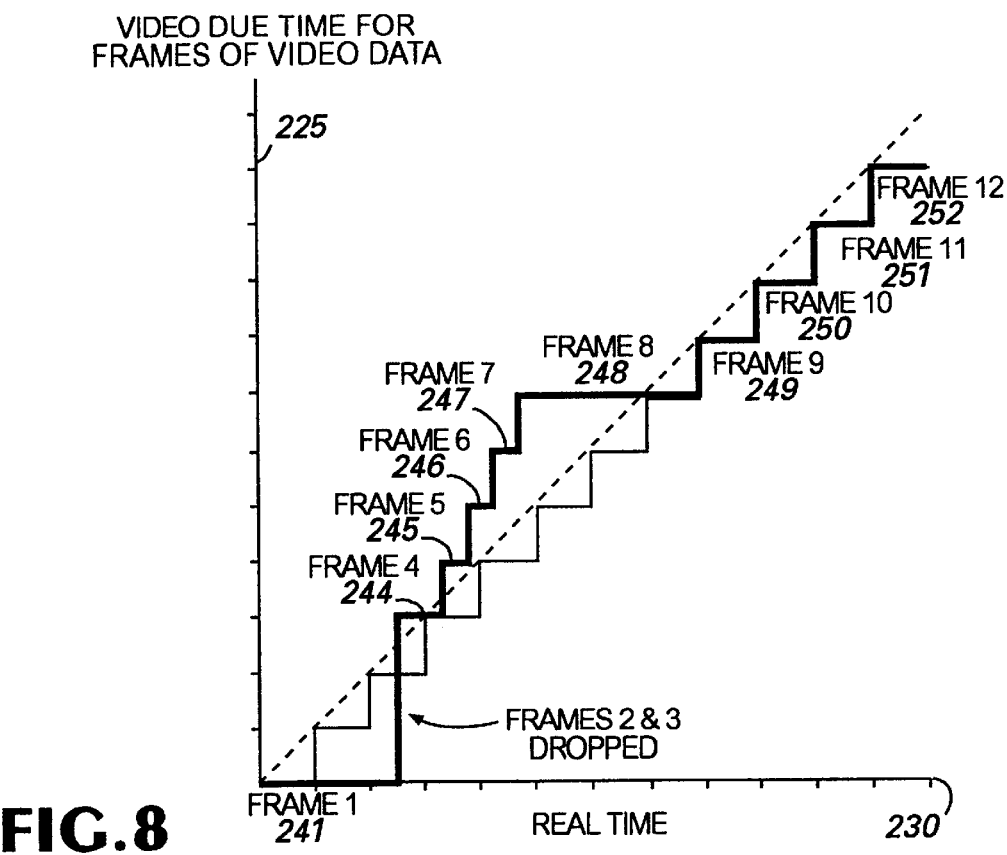
FIG. 8 is a diagram illustrating how frames of video may appear jerky when a slow computer begins to run faster.

FIG. 8 is a diagram illustrating how frames of video data 202 may appear jerky to the viewer when an apparently slow computer begins to run faster. Referring now to FIGS. 3–8, the computer 20 detects that it is no longer necessary to build up a buffer of time because it can process video data 202 quickly, such as after frame 8 248. Thus, the computer 20 reverts to the way a fast machine would play frames of video data 202 (i.e., at their normal due time). While frame 9 249 is played exactly at its respective due time, the resulting jerk or abrupt change (due to the lengthy playing time for frame 8 248) can be very objectionable to the viewer. In other words, the viewer sees video that appears to run fast (frame 4 244 to frame 8 248) and then seems to abruptly halt or jerk (at frame 8 248) before continuing.

Figure 9:
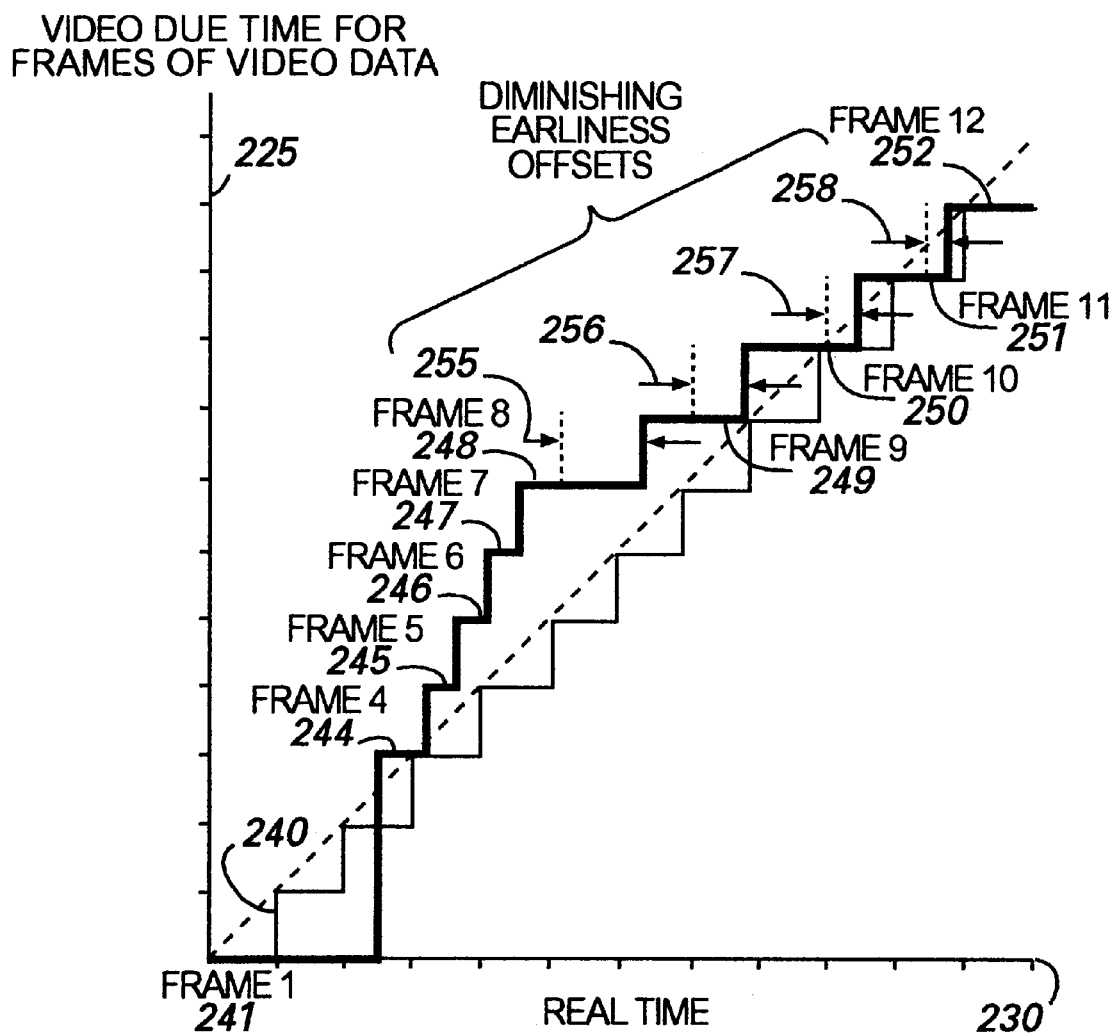
FIG. 9 is a diagram illustrating how a diminishing offset can be used to adjust the time when each frame of video is played in order to smooth the transition from when a computer appears slow and then begins to run faster.

FIG. 9 is a diagram illustrating how a diminishing offset, preferably called an earliness offset, can be used to adjust the time when each frame of video is played. By doing this, the transition from when a computer appears slow (slow machine mode) and then begins to run faster (fast machine mode) is smoothed and is less objectionable to the viewer. Referring now to FIGS. 3–9, after frame 7 247, an adjustment is made regarding when frame 8 248 and subsequent frames are played using the diminishing earliness offset 255–258. In this manner, the overall adjustment back to synchronization is made smoothly over several subsequent frames instead of the abrupt adjustment being made to a single frame, such as frame 8 248, with a jerky appearance to the viewer.

Referring back to FIGS. 1–2, the video renderer filter 218 plays the frame of video data 202 at the appropriately adjusted video due time into a video frame buffer 220, which is typically part of the video adapter 48. In the preferred embodiment, the video adapter 48 reads the video frame buffer 220 periodically in order to play the video data 202 onto the monitor 47. In this manner, the hardware within the video adapter 48, such as a video display system 222, displays the video data 202 onto the monitor 47 and the video frame buffer 220 is repeatedly refilled.

Another aspect of the present invention involves the ability to "throttle" or delay further playing of video data 202 when the audio buffer 212 begins to run low on decoded audio data 200. In the preferred embodiment, if the audio buffer 212 gets low, the audio renderer filter 210 sends a message to its designated quality message "sink" via the MFG module 36. The MFG module 36 instructs the audio renderer 210 that the MFG module 36 is to be used as this quality message sink. The MFG module 36 takes the message and forwards it to the video renderer filter 210. This is not the standard way that messages are handled as they normally go upstream. This is going across the streams (i.e., between the independent audio side and the video side). Upon receipt of the low buffer condition message and after the current frame of video data 202 was played, the video renderer waits for a predefined period of time depending on how low the audio buffer 212 currently is. This predefined period of time typically is nothing at all if the audio buffer 212 has a nearly full queue of decoded audio data 200. When the audio buffer 212 is approximately half empty, the predefined period of time is generally about 25 milliseconds. When the audio buffer 212 is about a quarter full, the predefined period of time is generally about 100 milliseconds. Finally, if the audio buffer 212 is nearly empty, then the predefined period of time is typically about 200 milliseconds. In summary, the MFG module 36 is typically an object within the operating system 35 having software filters which control and process multimedia data maintained in a storage, such as the source file 38.

In general, the MFG module 36 is accessed by program modules, such as the multimedia program module 37a, in order to play or access such multimedia data. In the preferred embodiment, there are several different ways in which program modules, such as the multimedia application program module 37a, can interact with the MFG module 36 and its filters, such as the video decoder 216 or the video renderer 218. One way uses standard Object Linking and Embedding (OLE) Common Object Model (COM) interfaces callable by the multimedia application program module 37a to interact directly with the MFG module 36. Using this programming model, the multimedia application program module 37a communicates at a higher level to indirectly interface with the filters within the MFG module 36. Another way uses specific MFG module 36 application programming interfaces (API) that allow the multimedia application program module 37a to directly interface with the filters within the MFG module 36. Additionally, the MFG module 36 supports conventional Media Control Interfaces (MCI) supported on older versions of the operating system 35 in order to maintain backward compatibility.

In this way, the MFG module 36 is typically called by the multimedia application program module 37a when the multimedia application program module 37a needs to have a digital movie played. The MFG module 35 has filters which read the time-stamped multimedia data from the source file 38, split the data into encoded audio data 200 and video data 202, and then independently process and play the audio data 200 and the video data 202 in such a way as to help maintain synchronization between the two. The video decoder filter 216 will selectively drop frames if the frame is deemed damaging depending on the lateness of prior frames of video data 202. This helps to maintain synchronization in combination with playing the frames of video data 202 potentially early with an offset time. This offset time is basically a variable time period, determined by the video renderer filter 218, that adjusts the video due time of the decoded frame of video.

With the above description of the architecture within the MFG module 36 used for controlling and processing of multimedia data, FIGS. 10–12 are flow diagrams illustrating the preferred steps of the preferred method for selectively dropping frames of video, playing frames of video ahead of corresponding audio, and signaling when audio data is low in order to help maintain synchronization between audio and video. FIG. 10 is an overall flow diagram of the preferred method. FIGS. 11 and 12 are detailed flow diagrams related to processes occurring within software modules which implement the preferred method, such as the video decoder filter 216 and the video renderer filter 218, respectively.

Referring now to FIGS. 1, 2 and 10, the preferred method 300 begins at step 305 where audio and video data, such as the audio data 200 and the video data 202 are read from a source file. In the preferred embodiment, this is accomplished by the source filter 204 and the splitter filter 206 typically separates out the encoded audio data 200 from the encoded video data 202.

At step 310, a frame of the encoded video data 202 is read preferably by the video decoder filter 216. As previously mentioned, the bitstream of encoded video data 202 is time-stamped to include the start or due time of the frame of video data 202 and the end time for the frame.

At step 315, the initial video due time (start time) for the frame of video data 202 is determined by reading the conventionally time-stamped information associated with the frame of encoded video data 202.

At step 320, if the system processing the video data 202, such as the personal computer 20 in FIG. 1, is deemed to be in a "slow mode" or state, then step 320 proceeds directly to step 330. Otherwise, the computer system is deemed to be in a "fast mode" or state and step 320 proceeds to step 325 where the encoded frame of video data 202 is decoded.

Fundamentally, there are two basic modes or states (fast mode and slow mode) in which to process frames of video data 202. Determining the current mode helps to determine whether a frame needs to be dropped in order to help maintain synchronization. Essentially, the fast mode is the ideal situation where every frame of video data 202 is played, regardless of how late it is played with respect to the audio data 200. This is analogous to being on a fast computer system where there exists enough processing speed to decode and play each video frame on time. If the video begins to be played later than the audio (such as when a high priority process grabs a great deal of compute cycles), no frames are dropped in the fast mode. This is because the computer system, in this fast mode, should be fast enough to quickly make up the difference and re-synchronize with the audio by playing video frames ahead of their respective initial video start times.

For example, samples of audio data 200 may be playing every 100 milliseconds. Ideally, to maintain synchronization, a frame of video data 202 should also be played once every 100 milliseconds. In fast machine mode, the computer 20 may require only 95 milliseconds to decode and play each frame of video data 202. This means that without any other competing processes stealing compute cycles from the processor 21, the computer system 20 typically will be waiting for 5 milliseconds for the video due time when the frame of video data 202 is played. In other words, the computer 20 will play frame 1 exactly on time, wait for 5 milliseconds, decode and play frame 2 exactly on time, wait for another 5 milliseconds, etc.

However, there are typically many threads being processed at any given time. This leads to less uniform decoding times. For example, the decode/play times (in milliseconds) for a sequence of frames of video data 202 might be 95, 70, 95, 80, 160, 75, 95, 80, 85, and 100 milliseconds. The first five frames can be played exactly on time, but at the start of the sixth frame (the frame after the frame which took 160 milliseconds to decode and play), the video will be more than half a frame late. In fast mode, no frames are dropped. Instead, the frames are allowed to be decoded and played even though they are late, in the hope that the computer 20 is fast enough to eventually make up the difference and re-establish synchronization.

In the above example, the computer 20 catches up over the next four frames by adjusting the start time of the frames to play earlier than the initial start time of each frame, as shown according to Table 1 below.

TABLE 1

| Frame | Difference between Audio & Video Before Frame | Offset Applied to Adjust Frame Start Time | Actual Time Taken to Decode & Play Frame | Difference between Audio & Video After Frame |
|---|---|---|---|---|
| Frame 1 | 0 | 0 | 95 | 0 |
| Frame 2 | 0 | 0 | 70 | 0 |
| Frame 3 | 0 | 0 | 95 | 0 |
| Frame 4 | 0 | 0 | 80 | 0 |
| Frame 5 | 0 | 0 | 160 | 60 |
| Frame 6 | 60 | −25 | 75 | 35 (60 − 25) |
| Frame 7 | 35 | −5 | 95 | 30 (35 − 5) |
| Frame 8 | 30 | −20 | 80 | 10 (30 − 20) |
| Frame 9 | 10 | −10 | 85 | 0 (10 − 10) |

TABLE 1-continued

| Frame | Difference between Audio & Video Before Frame | Offset Applied to Adjust Frame Start Time | Actual Time Taken to Decode & Play Frame | Difference between Audio & Video After Frame |
|---|---|---|---|---|
| Frame 10 | 0 | 0 | 100 | 0 |

Those skilled in the art will recognize that when the actual time taken to decode and play the frames is less than the standard 100 milliseconds (determined by the audio data 200), the difference between the audio and the video begins to be made up. This occurs by adjusting the start or due time of the frame of video data 202. Thus, in fast mode, no frames are dropped and the start times of frames are adjusted in the hopes of making up time to help maintain synchronization.

Essentially, the slow mode is the situation where frames of video data 202 are played consistently late. In the above example, certain circumstances may force the computer 20 to actually play the nominally 100 millisecond frames in 120 millisecond times. This may occur if the processor 21 is too slow to adequately decode and play the frames of video data 202 in a timely manner. This also may occur if a competing process grabs compute cycles from the processor 21, thus making the processor 21 appear functionally under powered due to the lack of available cycles. In these situations, the computer 20 is too slow to play all the frames of video data 202 and there is no immediate hope of catching up to the audio data 200. Thus, a frame of video data 202 is eventually dropped in order to make up the difference in time between the audio and the video. Applying an offset in order to play the video data 202 ahead in time as fast as possible, in conjunction with dropping other frames of video data 202 when the difference in time becomes too great, helps to maintain synchronization.

Referring back to FIGS. 1, 2 and 10, a determination as to whether the encoded frame of video data 202 is "not damaging" is made at step 330. In the preferred embodiment, the video decoder 216 and the video renderer 218 each keep track of various statistics on the timing of frames. In particular, the following timing statistics (in addition to others not listed) are typically tracked by the filters:

The lateness of the last frame (compared to when it should have been played)

The average lateness of the previous frames (compared to when they should have been played). In the preferred embodiment this is an exponentially smoothed moving average. In other words, with each frame, the average lateness is updated to 9/10 of the previous average plus 1/10 of the new lateness value.

The average time between I-frames

How many frames since the last dropped frame

How many frames since the last I-frame

When processing a bitstream of video data 202 without a history of timing statistics, the video decoder and video renderer use default values which are set so as to ensure that the system does not begin by dropping frames. These defaults are preferably 1 second between I frames, draw times of 10 milliseconds for B-frames or P-frames, 20 milliseconds draw times for I-frames, and 20 milliseconds decode time for I-frames, 0 frames since the last I-frame, 0 average lateness, and 0 current lateness.

In the preferred embodiment, the video decoder filter 216 does not initially know the type of frame before the next frame is decoded. A frame of video data 202 is deemed "not damaging" depending how late the next frame is predicted to be played. The predicted lateness of the next frame is preferably based on determining how late the next frame would be if it was a B-frame using data on how long it takes to decode B-frames and the lateness of the last frame (reported by the video renderer filter 218). In other words, whether a frame is "not damaging" varies along a continuum of how late the next frame of video data 202 should be if decoded.

In a first situation, the next frame is predicted to be later than the average time between I-frames. In this situation, the next frame is deemed damaging. Accordingly, this frame is not decoded regardless of the type of the frame because the video is too far behind the audio and the frame must be dropped to make up time.

In a second situation, the next frame is predicted to be not later than the average time between I-frames and the next I-frame is predicted to be due. In this situation, the next frame is not damaging only if it is an I-frame. In other words, in this second situation all of the P-frames or B-frames would be deemed damaging, screened out, and dropped.

A third situation exists where the next frame is predicted to be earlier than the average time between I-frames and the next I-frame is not already due. In this situation, the next frame is not damaging if it is either an I-frame or a P-frame. In other words, only the B-frames would be deemed damaging in this final situation and would be screened out and dropped. In summary, the next frame can fall into one of several categories (damaging regardless of frame type, damaging if either a P-frame or B-frame, and damaging only if a B-frame) depending on how late the prediction is for the next frame if it was decoded.

A final situation exists where the next frame is predicted to be on time, or ahead of time or acceptably late. In this case it is determined to be "not damaging" regardless of its type.

Referring back to FIGS. 1, 2 and 10, if the encoded frame of video data 202 is deemed "not damaging," step 330 proceeds to step 325 where the encoded frame of video data 202 is decoded. However, if the encoded frame of video data 202 is deemed "damaging" (depending on how late it probably would be if decoded & played), step 330 proceeds directly to step 335 where the encoded frame of video data 202 is dropped (not decoded or played) before proceeding back to step 310 to read the following frame of video data 202.

As previously mentioned, the encoded frame of video data 202 is decoded at step 325. Once decoded, step 325 proceeds directly to step 340 where an offset time is applied to the time stamped start or due time to produce an adjusted video due time. This offset time allows the frame of video data 202 to be played ahead of when the audio data 200 is played. By varying or adapting this offset time, depending on the circumstances or mode of the computer 20, synchronization of the audio and video can be adjusted and maintained.

As previously described with regards to the video renderer filter 218 in FIG. 2, the offset time applied to the initial start time for the frame can have several different components, each of which are useful in helping to maintain audio and video synchronization. One component of the offset time is a target offset applied to make the video frame play earlier than its initial start time. The target offset time is initially set to where the video and the corresponding audio appear substantially synchronous to the viewer when the video data 202 is played ahead of the audio data 200. Substantially synchronous is essentially when the out-of-synchronization time difference is not yet noticeable to the viewer. In the preferred embodiment, this initial target offset time is approximately 30 milliseconds.

Another component of the offset time is a refresh offset time corresponding to the delay when waiting for the screen display on the computer monitor 47 to be updated. In the preferred embodiment, this refresh offset time is approximately 8 milliseconds and is always applied to take advantage of this delay.

In addition to the target offset time and the refresh offset time, the offset time can also include a predetermined time, preferably called an Earliness offset time, having a diminishing value. Initially, the value of the Earliness offset is zero. If the video renderer filter 218 has been late playing video frames and now is able to play future frames early, the offset time can include an Earliness offset having a predetermined value which diminishes over time. This is typically the kind of offset time used when the system is transitioning from a slow mode (where frames are being dropped) to a fast mode (where frames are not dropped and are played as early as possible until frames are back to being played on time). Rather than abruptly change to playing the frame of video data 202 adjusted to have the earliest offset (once in fast mode), the offset time is capped at the predetermined value which diminishes over time typically by one eighth each successive frame, e.g. from 50 milliseconds to 44 milliseconds, to 39 milliseconds and so on. This diminishing offset time provides a mechanism for playing the video ahead of the audio to maintain synchronization while smoothing transitions due to changes in apparent processing power (i.e., from the slow mode to fast mode) and avoiding abrupt changes in the video.

For example, the computer 20 may be playing frames of video data 202 on time and in synchronization with the played audio data 200. The viewer (i.e., the user of the computer 20) may start another compute intensive process, such as recalculating a large spreadsheet or downloading another program module 37b from a remote computer 49 over a network 52. At this point, the computer 20 may go into a slow mode because the processor 21 cannot decode and play the frames of video data 202 fast enough to maintain synchronization with the audio data 200. The next frame of video data 202 may be played 50 milliseconds late. The frame following may be played 100 milliseconds late. The next frame may be played 150 milliseconds late but the video decoder 216 may indicate that several frames were dropped before this last frame was decoded. In other words, the video processing is running late and the system enters the slow mode where frames are dropped depending on how late the video is.

However, once the compute intensive process is finished, the apparent processing power of the computer 20 rebounds dramatically. At this point, the next frame of video data 202 can be decoded and played before its time-stamped start time by 50 milliseconds and the computer 20 is back in fast mode. Thus, the Earliness offset time is set to 50 milliseconds early.

When the next frame of video data 202 arrives 100 milliseconds early, this is where the diminishing effect of the Earliness offset time is applied to smooth the transition from slow mode to fast mode. This next frame of video data is played at only 45 milliseconds early, due to the diminished value of the Earliness offset time, instead of the full 100 milliseconds early. In effect, the Earliness offset time caps the amount of offset applied during the transition and smoothes it out over time in a slow-to-react fashion.

Referring back to FIGS. 1, 2 and 10, once the appropriate offset time is applied to the initial video due time to produce the adjusted video due time, the frame of video data 202 is played at this adjusted due time at step 345. At step 350, if the played frame was the last frame in the sequence of frames, then the preferred method terminates after step 350. However, if the played frame was not the last frame, the step 350 proceeds to step 355.

At step 355, if the audio buffer 212 is low on decoded audio data 200, then step 355 proceeds to step 360. However, if the audio buffer 212 is not in a low condition, step 355 proceeds back to step 310 for the next frame of video data 202.

At step 360, the video renderer 218 essentially waits in a "throttle" wait state for a predefined period of time before playing any additional frames of video data 202, depending on how low the audio buffer 212 actually is. By waiting in this "throttle" state, the audio decoder 208 and audio renderer 210 are given time to "catch up" to the video and process more audio data 200 in order to help maintain audio and video synchronization.

Implementation in Separate Video Software Filters

In the preferred embodiment, the preferred method 300 described above is implemented in two distinct software objects called the video decoder filter 216 and the video renderer filter 218 used to decode and play MPEG-encoded multimedia data. Each of these objects perform specific functions during the overall job of processing multimedia data and interact with each other to help maintain the synchronization between the audio and video.

Dropping frames of video data 202 is preferably done as early in the process as possible. Thus, the video decoder filter 216 typically is the module doing most of the decision making and predicting on whether to drop a frame (e.g., determining if the encoded next frame of video data 202 is damaging or not). However, there are some uncommon situations where a frame of video data 202 is decoded only to realize later that the frame should not be played. This is where the video renderer filter 218 is also able to drop a frame of video data 202 as an optimization on the ability to maintain synchronization between the audio and video. Furthermore, the video renderer filter 218 is responsible for adjusting when a frame of video data 202 is to be played. These situations are described below with respect to FIGS. 11 and 12.

FIG. 11 is a detailed flow diagram illustrating steps from the preferred method for processing video data 202 within a video decoder module, such as the video decoder filter 216, in order to help maintain audio and video synchronization. Referring now to FIGS. 1, 2, 10, and 11, the preferred method 400 begins at step 405 where data is received from the splitter filter 206. This data is the encoded next frame of video data 202.

At step 410, the lateness of the next frame of video data 202 is predicted by assuming it is a B-frame. As previously mentioned, the lateness is the time difference between when a frame of video data 202 should have been played in synchronization with the corresponding audio data 200 and when the frame of video data 202 is actually played. In this step, the predicted lateness is calculated based upon an average of how long is takes to decode B-frames and what the actual lateness of the last frame of video data 202 played was.

In the preferred embodiment, the video decoder filter 216 keeps track of the average time it takes to decode B-frames. However, the video decoder filter 218 receives a message or signal, preferably called a quality message, from the video renderer filter 218 reporting how late the last frame was that was played. The video decoder filter 216 (i.e., the supplier of video data 202) will either acknowledge this lateness report back to the video renderer filter 218 or will not depending on its capabilities. As the video renderer 218 is preferably capable of playing raw video which requires no decoding at all, the component or filter which supplies it with data may not be a decoder at all. Such a component might not be able to handle frame dropping, leaving all the work to the decoder. Thus, the acknowledgment from the supplier of video data 202 (i.e., the video decoder 216) allows the responsibility of dropping frames of video data 202 to be optimally shared and distributed.

After the predicted lateness of the next frame is calculated, this value is used to make several decisions in steps 415, 425, and 430 on whether or not the video decoder filter 216 (and the computer 20 as a whole) is in fast mode or slow mode. At step 415, if there has not been at least ten frames since the last dropped frame, step 415 proceeds to step 420. However, if there has been at least ten frames since the last dropped frame, the computer 20 may be in the fast mode and step 415 proceeds to step 425.

At step 425, if the average actual lateness of previously played frames is less than 20 milliseconds, the computer 20 may be in the fast mode and step 425 proceeds to step 430. Otherwise, step 425 proceeds back to step 420.

At step 430, if the last played frame of video data 202 was reported to have been less than 100 milliseconds late, the computer 20 is in the fast mode and step 430 proceeds to step 435. Any actual lateness as a result of decoding and playing this frame will probably only be a momentary glitch that can easily be handled by simply playing the video data 202 as fast as possible (noting the previous discussion on the offset times) until the video data 202 is caught up with and back in synchronization with the audio data 200. However, if the last played frame of video data 202 was reported to have been 100 milliseconds or more, step 430 proceeds back to step 420 and the computer 20 is deemed to be in the slow mode.

At step 435, this next frame of video data 202 is decoded regardless of the type of the frame. At step 440, the video decoder filter 216 sends the decoded frame of video data 202 to the video renderer filter 218. In the preferred embodiment, the video decoder filter 216 actually sends a message downstream to the video renderer filter 218 informing the video renderer filter 218 that the decoded data is ready for processing. The video renderer filter 216 is then able to receive the decoded data.

At step 445, the video decoder filter 216 essentially enters an idle state where it waits for notification from its supplier, the splitter filter 206, that another frame of encoded video data 202 is ready to be processed.

At step 450, if the video decoder filter 216 receives notification of another frame of encoded video data 202 from its supplier, then step 450 proceeds back to step 405. However, if there is no notification of another frame, step 450 proceeds back to step 445.

Returning back to step 420, in this situation, the computer 20 is in the slow mode and now a decision is made to determine if the next frame is damaging based on the predicted lateness of the next frame and the type of the next frame. At step 420, if the predicted lateness of the next frame of video data 202 is greater than the average time between I-frames (also called the average inter I-frame time), then step 420 proceeds to step 455. Otherwise, step 420 proceeds to step 460.

At step 455, the predicted lateness of the next frame is so late (i.e., beyond the average time between I-frames) that in order to try to help maintain synchronization between the audio data 200 and the video data 202, the next frame is essentially deemed damaging and must be dropped no matter what type it is.

At step 460, the time when the next I-frame is due is predicted based upon the tracked frame statistic on the average time between I-frames and knowing the number of frames since the last I-frame. At step 465, if the next I-frame is predicted to be due, step 465 proceeds to step 470 where steps 470, 480, and 485 effectively skip to the next I-frame in the bitstream of video data 202. However, if the next I-frame is not already due, then step 465 proceeds to step 475.

At step 470, the video decoder filter 216 is setup to decode only I-frames before proceeding to step 480. In the preferred embodiment, the video decoder filter 216 is able to screen for or target the next of a certain type of frame without actually decoding the frame.

At step 480, the next frame of video data 202 is decoded if it meets the targeted setup criteria for decoding, such as only decode if the frame is an I-frame. At step 485, if the next frame was decoded because it matched the targeted criteria for decoding, step 485 proceeds to step 440 where the decoded video data is sent downstream to the video renderer filter 218 and the video decoder 216 once again enters the idle wait state at step 445. However, if the next frame was not decoded at step 480 because it did not match the targeted decoding criteria, the next frame is dropped and step 485 proceeds to the idle wait state at step 445 waiting for another frame of video data 202. In the preferred embodiment, the video decoder 212 generates a return code if the screened frame does not match the targeted criteria and get decoded at step 480. This return code indicates a frame has been dropped.

At step 475, it is predicted that the next I-frame is not already due. Thus, the video decoder filter 216 is setup to decode only I-frames or P-frames before proceeding to step 480. In this manner, if the next frame is a B-frame, it will be dropped at step 480. However, if the next frame is either an I-frame or a P-frame, step 480 decodes the frame and the decoded frame of video data 202 is sent to the video renderer filter 218 (via steps 485 and 440).

In summary, based on the predicted lateness for the next frame of video data 202, the next frame of data is either (1) decoded regardless of the frame type, (2) decoded if it is either an I-frame or a P-frame, (3) decoded only if it is an I-frame, or (4) not decoded at all (is dropped) because the predicted lateness indicates that the video is far behind the audio and the next frame needs to be dropped in order to make up time and help maintain synchronization. Once the frame of video data 202 is decoded, the video renderer filter 218 is typically notified of the data.

Figure 12A:
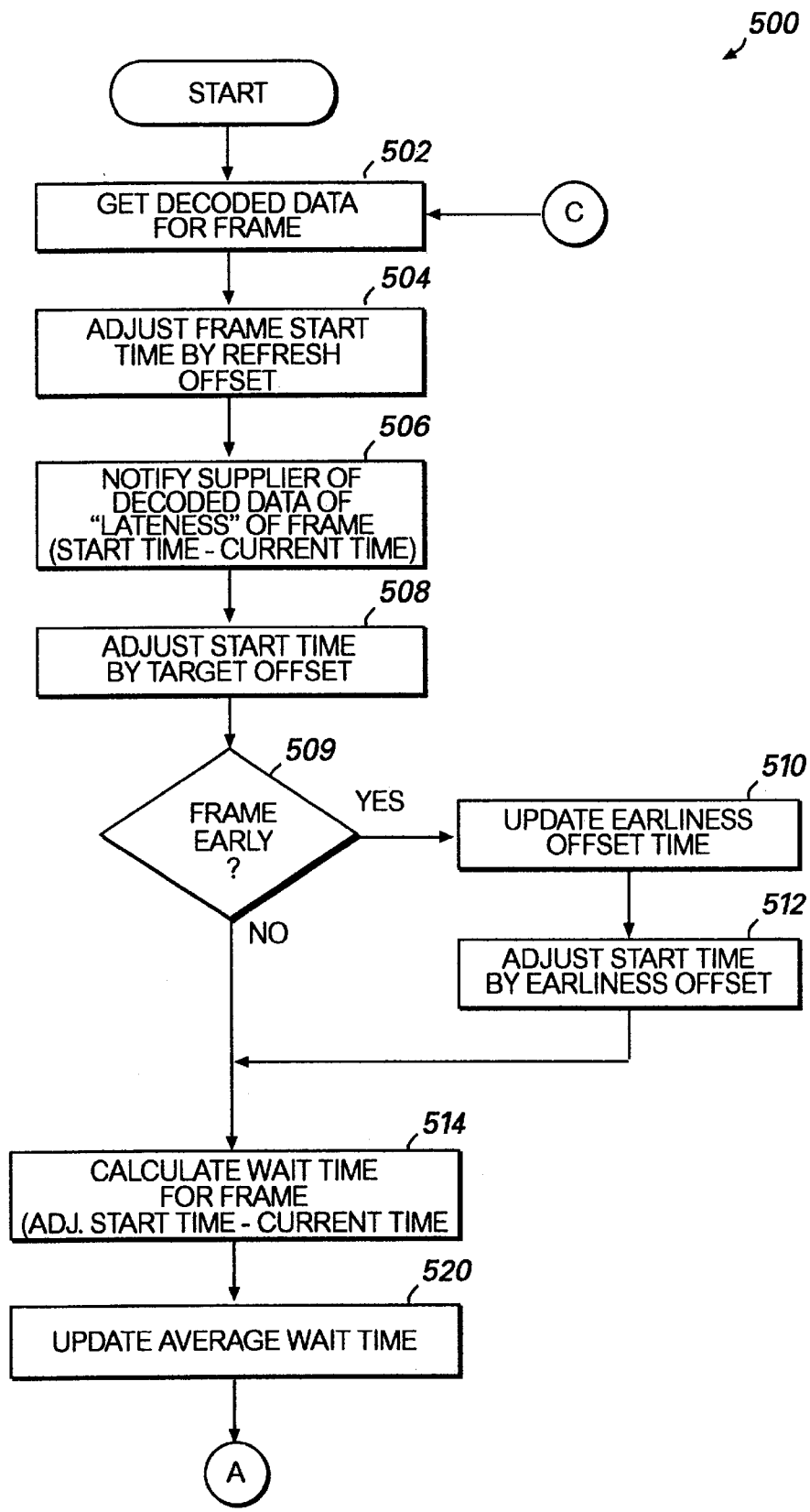
FIG. 12, consisting of FIGS. 12A–12C, is a detailed flow diagram illustrating steps from the preferred method for processing video data within a video renderer module in order to help maintain audio and video synchronization.
Figure 12B:
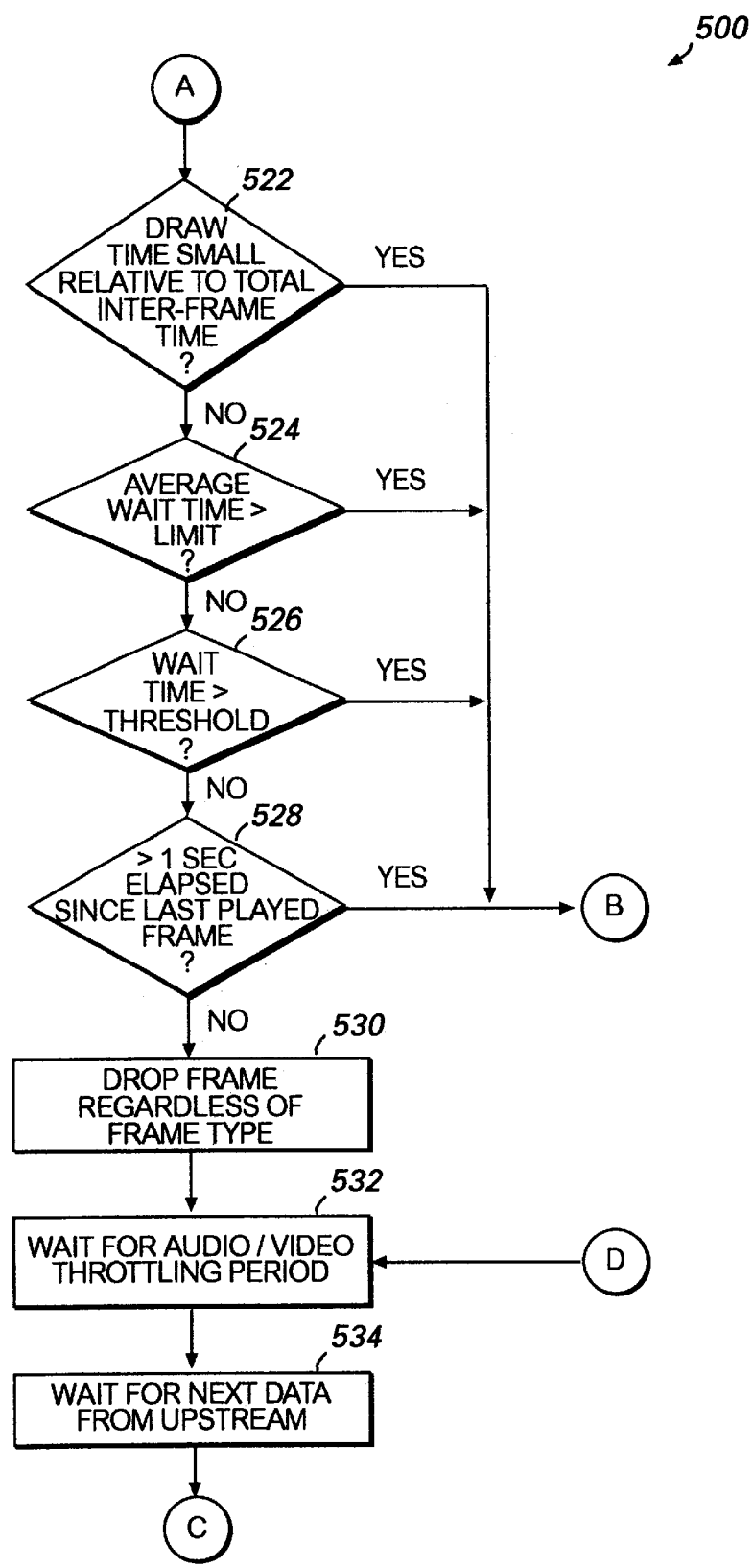
Figure 12C:
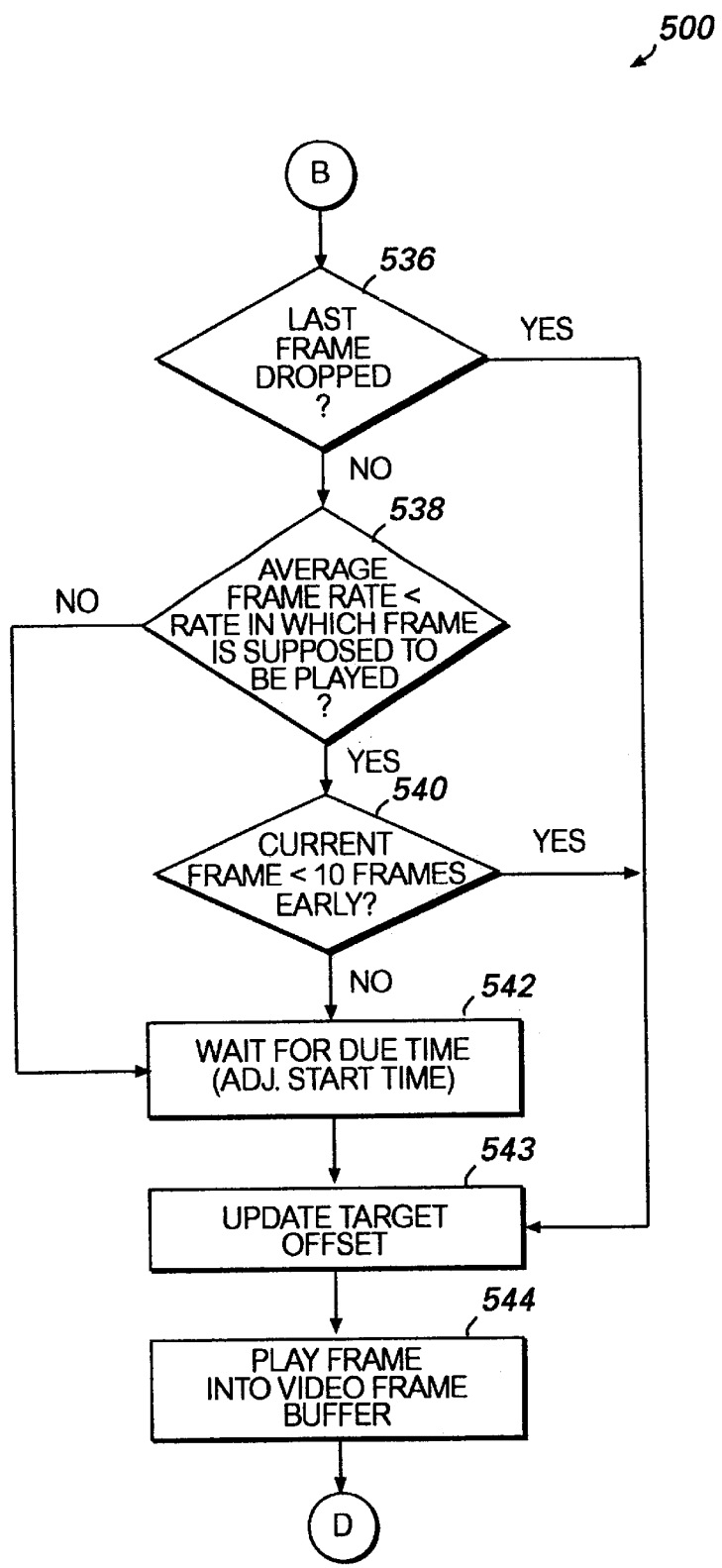

FIG. 12, consisting of FIGS. 12A–12C, is a detailed flow diagram illustrating steps from the preferred method for processing video data within a video renderer module, such as the video renderer filter 218, in order to help maintain audio and video synchronization. Referring now to FIGS. 1, 2, 10 and 12A, the preferred method 500 begins at step 502 where the video renderer filter 218 gets the decoded data on the frame preferably from a data supplier. In the preferred embodiment, the data supplier is the video decoder filter 216. Included with the decoded data is the time-stamped information on when the frame of video data 202 is due or should be played.

At step 504, the start time of the frame of video data 202 is adjusted by an offset time called the refresh offset time. As previously described, the refresh offset time is an offset corresponding to the delay when waiting for the screen display on the computer monitor 47 to be updated. The value of this refresh offset time ideally should be half of the actual refresh rate of the monitor 47, where the actual refresh rate is determined either by an averaging method or by instantaneous timing measurements on each sweep of the monitor 47. In the preferred embodiment, a default value of 8 milliseconds for the refresh offset is used to represent approximately half of the refresh rate of an exemplary monitor 47. This offset is applied to each frame in an effort to play the video ahead of the audio order to help maintain audio and video synchronization.

At step 506, the video renderer filter 218 notifies the supplier of the decoded video data 202 (i.e., the video decoder filter 216) of how late the current frame of decoded video data 202 will be played. In the preferred embodiment, one filter can be designated as a clock which generates an interrupt or provides a current reference time when prompted to do so by another filter. In this manner, the audio renderer filter 210 can be designated as the clock for the video renderer filter 218 and the video renderer filter 218 may prompt its designated clock source (e.g., the audio renderer filter 210) for the current reference time.

The video renderer filter 218 determines the lateness of the current frame of decoded video data 202 by comparing the current reference time from its designated clock source to the start time of the frame adjusted by the refresh offset. The difference between these times is the lateness of the current frame which is reported back to the supplier.

At step 508, the start time of the frame is adjusted with a target offset time, which is a very slow correction factor. Essentially, the target offset time is initially set to a value where video is played far enough ahead of audio but the visual loss of synchronization is not yet noticeable to the viewer. This initial value can be generally less than 50 milliseconds and is preferably set to be 30 milliseconds. Once initially set, the target offset is updated very slowly to reflect how late frames are being played. The actual updating of the target offset occurs at step 543 on FIG. 12C. Therefore, once the start time has been adjusted by the target offset time (with the initial value or an updated value), step 508 proceeds to step 509.

In steps 509–512, the start time of the frame is adjusted with the Earliness offset time (as previously discussed with regard to FIG. 10). The Earliness offset is typically updated during the transition from the slow mode to the fast mode. At step 509, if the current frame of decoded video data 202 is actually early (i.e., the reported lateness is a negative number), step 509 proceeds to steps 510 and 512 where the system is in fast mode or is transitioning from slow mode to fast mode. Otherwise, the frame is late and step 509 proceeds directly to step 514 to handle the current frame in the slow mode.

At step 510, the Earliness offset time is updated according to the history of the frames. If the prior frames of video data 202 were late and this current frame is early, then the value of the Earliness offset time is set to how early the current frame is. This is the situation in the example described in FIG. 10 where the computer 20 was running behind and then a frame was decoded 50 milliseconds early.

If the prior frame was also early, then the value of the Earliness offset time is set to a diminished amount on consecutive frames in order to smooth the transition from slow mode to fast mode and avoid a jerky appearance of the displayed video. For example, the next frame of video data 202 in the sequence had an Earliness offset time value limited to 45 milliseconds, which is a diminished value from the initially set Earliness offset time of 50 milliseconds. The amount that each successive value the Earliness offset time is diminished when consecutively processing early frames is one eighth of its current value. In this manner, the Earliness offset time caps the amount of offset applied during the transition and smoothes it out over time in a slow-to-react fashion.

At step 512, the start time for the current frame (already adjusted for the refresh offset and any target offset) is further adjusted by the value of the updated Earliness offset time before proceeding to step 514.

At step 514, the wait time for the current frame is calculated. This is typically done based upon the adjusted start or video due time for the current frame using the current reference time from the clock, the time-stamped start time for the frame, and any offsets applied to the start time (such as the refresh offset time, the target offset time, and the Earliness offset time). After the wait time is calculated, step 514 proceeds directly to step 520.

At step 520, the video renderer filter 218 updates a timing statistic on the average wait time before playing the frame of decoded video data 202 before proceeding to step 522 on FIG. 12B.

Referring now to FIGS. 1, 2, 10, 12A, and 12B, decision steps 522–528 essentially are an optimization where the video renderer filter 218 is determining if the decoded frame may still need to be dropped in order to help maintain synchronization of the audio data 200 and video data 202. At step 522, if the time needed to draw the current frame is relatively small, typically about 25%, when compared to the average total time between frames (decoding and drawing/playing), step 522 proceeds to step 536 on FIG. 12C where the frame should be played. In this situation, there is not a great amount of time saved by dropping the current frame of decoded video data 202. Otherwise, step 522 proceeds to step 524.

At step 524, if the average wait time is beyond a predefined limit of time, step 524 also proceeds to step 536 on FIG. 12C because the computer 20 is probably a fast machine as indicated by the large average wait time. In the preferred embodiment, this limit is typically set to 8 milliseconds based on empirical experience with processing frames of video data 202. Otherwise, step 524 proceeds to step 526.

At step 526, if the current wait time is beyond a threshold of time, step 526 also proceeds to step 536 on FIG. 12C where the current frame should be played. In the preferred embodiment, the value of this threshold depends on if the video decoder filter 216 has acknowledged the lateness reports sent at step 506. If acknowledged, the threshold is preferably set at two and a half times the average time between frames. If not acknowledged, the threshold is preferably set at half the time of the average time between frames. However, if the current wait time is not beyond this threshold of time, step 526 proceeds to step 528.

At step 528, if a relatively long period of time has elapsed since the last played frame, preferably 1 second, it is likely that the computer 20 is slow and is continuing to fall farther behind in synchronization, step 528 proceeds to step 536 on FIG. 12C to play the frame. In such a situation, frames are being continuously dropped without much hope of restoring synchronization and the viewer is not being presented with any new video data 202. In order to provide some kind of feedback to the viewer that the sequence of video data 202 and the computer 20 itself is not malfunctioning, the video renderer 218 allows a periodic frame to be played, despite the time it takes to decode and play the frame. However, if a frame has been recently played, step 528 proceeds to step 530.

At step 530, the decoded frame is dropped regardless of the frame type. In the preferred embodiment, this is avoided if at all possible (via the decisions made in steps 522–528) because much time has been expended decoding the frame of video data 202 and any dropping of frames is best done up front within the video decoder filter 216.

At step 532, the video renderer 218 essentially waits in a "throttle" wait state for a predefined wait period, called a throttling period, before playing any additional frames of video data 202. The length of this wait period depends on how low the audio buffer 212 actually is. By waiting in this "throttle" state, the thread processing the video data 202 (i.e., the video renderer filter 218) is blocked so that the audio decoder 208 and audio renderer 210 are given time to "catch up" to the video. This allows more decoded audio data 200 to become available within the audio buffer 212 in order to help maintain audio and video synchronization.

Once the throttle wait period is over, step 532 proceeds to step 534 where the thread processing the video renderer filter 218 is returned to an idle state waiting for the next frame of decoded video data 202 from upstream. Step 534 proceeds to step 502 on FIG. 12A once the next frame of video data 202 is "pushed" to the video renderer filter 218 by the video decoder filter 216 (the supplier).

Referring now to FIGS. 1, 2, 10, 12A, 12B, and 12C, a determination of whether the last frame was dropped is made at step 536. If so, then step 536 proceeds directly to step 543 where the target offset is updated before playing the frame. This is characteristic of the slow mode where frames of video data 202 are played as soon as possible to make up for prior lateness and to help maintain synchronization between the audio and video. However, if the last frame was not dropped, step 536 proceeds to step 538.

At step 538, if the average frame rate is greater than the rate in which the current frame is supposed to be played, then step 538 proceeds to step 540. If not, then step 538 proceeds directly to step 542. The average frame rate is calculated as the inverse of the average time between frames. The rate at which the current frame is supposed to be played is calculated using the original time-stamped information (i.e., the initial start time and the initial end time) related to the current frame of video data 202.

At step 540, if the current frame is less than ten frames early, then step 540 proceeds directly to step 543 where the target offset is updated before playing the frame. This optimization is performed to prevent the video frame from being played too early. If frames were previously very late, there exists a possibility that subsequent early frames can be played earlier and earlier before realizing that the machine is actually a fast machine. Thus, if the current frame is more than 10 frames early, the preferred approach is to wait for the current frame's due time.

At step 542, the video renderer filter 218 waits for the adjusted video due time (i.e., the start time adjusted by the various offset times) before proceeding to step 543. Essentially, step 542 puts the video renderer filter 218 to sleep awaiting an alarm message indicating the adjusted video due time. This alarm is typically supplied by the designated clock source. Other threads may be processed by the processor 21 during this waiting or sleeping period. When such an alarm message is received from the designated clock source, step 542 proceeds to step 543.

At step 543, the target offset is updated. In some situations, it may be actually later than the adjusted video due time when the alarm message is received. This may happen when compute intensive processes have been grabbing compute cycles from the processor 21 during the waiting period. It is only at this point that the video renderer filter 218 can determine how late the current frame will be actually played. Thus, the target offset is updated at step 543.

Generally, the target offset is updated in a smoothed manner over time using a fraction of the last value of the target offset and a fraction of the actual lateness of the current frame. In the preferred embodiment, the target offset is updated by adding one percent of the lateness of the current frame to 99 percent of the last value of the target offset.

In this manner, the target offset will diminish to zero on a computer 20 processing the frames in the fast mode. However, if the computer 20 is slow in decoding and playing the frames, the target offset will be slowly updated to help maintain synchronization in a very slow to react fashion. Those skilled in the art will recognize that utilizing the target offset in such a manner permits video to be played ahead of the audio. As a result, a play-ahead time margin for any future late frames is built in while degrading the video as little as possible.

At step 544, the current frame is played into the video frame buffer 220. After playing the current frame, step 544 proceeds back to step 532. At step 532, the need to wait for more decoded audio data 200 is checked, preferably by checking the status of a related quality message with the MFG module 36.

In summary, the start time of the frame of decoded video data 202 is adjusted by an offset time. This value of this offset time can be adaptively changed to correspond to a refresh offset time, a target offset time with a predetermined initial value, and an diminishing Earliness offset time. The video renderer filter 218 will play the current frame either at its adjusted start or due time or it will play the current frame immediately in order to help synchronize the video data 202 to the audio data 200. The video renderer filter 218 is also capable of dropping a frame of decoded video data 202 if certain conditions exist where it is advantageous and it may help to maintain synchronization.

Furthermore, in the preferred embodiment, there is an additional optimization on which of the video filters does the actual "playing" or drawing of video data 202 into the video frame buffer 220. This optimization introduces two drawing modes, an "indirect" drawing mode and a "direct" drawing mode. In the direct drawing mode, the video decoder filter 216 is actually able to transfer or "draw" the decoded video data directly into the video frame buffer 220 at step 544 while the video renderer filter 218 still performs the rest of the steps in FIG. 12. By doing this, the fastest possible decoding and playing time is achieved because the video data 202 is played as fast as it is decoded. The direct drawing mode is preferable when supported by the computer 20 and the related software modules. Furthermore, this alleviates the need to copy the decoded video data 202 into the video renderer filter 218 which eventually will transfer or "draw" the same decoded data into the video frame buffer 220. This duplicated transferring is characteristic of the "indirect" drawing mode. However, embodiments of the present invention are not limited to either of these drawing mode implementations.

Conclusion

From the foregoing description, it will be appreciated that the present invention provides a system and method for playing video data 202 ahead of corresponding audio data 200 in order to help maintain synchronization between the audio data 200 and the video data 202. Two software objects or filters (the video decoder filter 216 and the video renderer filter 218) are used to process the video data 202. An initial start time of the video data 202 is determined and, if possible the frame of video data 202 is decoded. Otherwise, the frame is selectively dropped in order to help maintain synchronization. An adaptive offset time is applied to the initial start time of a decoded frame of video data 202 in order to produce an adjusted start time for the decoded frame. The value of the offset time can be adapted to include a refresh offset related to sweep delays in computer monitors 47, a target offset with an initial value which helps to build in a play-ahead margin for future late frames, and an Earliness offset which is diminishing over time to help smooth synchronization transitions. Additionally, the playing of video data can be slowed down in response to a low condition of the audio buffer. This avoids sound breaks and also helps to maintain synchronization.

The foregoing system may be conveniently implemented in one or more program modules that are based upon the flow charts in FIGS. 10, 11, 12A–12C. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of helping to maintain synchronization between MPEG-encoded audio data 200 and frames of MPEG-encoded video data 202 by selectively decoding and dropping frames of video data 202 and adaptively applying various offsets to the start of the frame. However, those skilled in the art will understand that the principles of the present invention apply to any process that attempts to maintain audio and video synchronization, regardless of the encoding format.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for playing video data ahead of corresponding audio data in order to help maintain synchronization between the audio data and the video data, comprising the steps of:

(a) determining an initial video due time as when the video data should be played, the initial video due time being the same as an audio due time, the audio due time being when the audio data corresponding to the video data should be played;

(b) applying an offset time to the initial video due time to produce an adjusted video due time, the adjusted video due time being earlier than the initial video due time; and (c) playing the video data at the adjusted video due time, thereby playing the video data ahead of the corresponding audio data and helping to maintain overall synchronization between the audio data and the video data.

2. The method of claim 1, wherein steps (b)–(c) are performed only if the previous video data was played late relative to the corresponding previous audio data.

3. The method of claim 1, wherein the offset time is initially set to a value where the video data and the corresponding audio data appear substantially synchronous when the video data is played at the adjusted video due time ahead of the corresponding audio data.

4. The method of claim 3, wherein the value of the offset time is less than 50 milliseconds.

5. The method of claim 4, wherein the value of the offset time is approximately 30 milliseconds.

6. The method of claim 1, wherein the offset time is set to a value corresponding to a delay when waiting for a screen display on a computer monitor to be updated.

7. The method of claim 6, wherein the value of the offset time is less than 20 milliseconds.

8. The method of claim 7, wherein the value of the offset time is approximately 8 milliseconds.

9. The method of claim 1, wherein the video data comprises a sequence of frames; and
wherein the offset time is set to a diminishing value if a mode for playing and synchronizing the video data to the corresponding audio data is transitioning from a slow mode to a fast mode,
the slow mode being where at least one prior frame of the video data is played later than the corresponding audio data, and
the fast mode being where the prior frames of video data are played with and ahead of the corresponding audio data.

10. The method of claim 9, wherein the slow mode is further characterized as where at least one of the prior frames was dropped.

11. The method of claim 1, wherein the video data comprises a sequence of frames; and
further comprising the step of (d) selectively dropping an frame of the video data if the frame of video data is deemed damaging to help maintain synchronization between the video data and the corresponding audio data.

12. The method of claim 11, wherein the frame of the video data is deemed damaging if the frame of video data will take longer than a predetermined period of time to decode.

13. The method of claim 12, wherein the predetermined period of time is the average time between independent frames of the video data.

14. The method of claim 11, wherein the frame of the video data is deemed damaging if playing the frame of video data will not help maintain the synchronization between the video data and the corresponding audio data.

15. The method of claim 1, wherein the video data comprises a sequence of frames; and
further comprising the steps of:
(d) waiting for a predetermined period of time if an audio buffer is in a low condition; and
(e) repeating steps (a)–(d) for the next frame of video data.

16. The method of claim 15, wherein the predetermined period of time varies according to a level of audio data within the audio buffer.

17. A method for signaling between an audio object and a video object in order to help maintain synchronization between the audio object and the video object, comprising the steps of:
(a) playing video data by the video object;
(b) determining if a message signal was sent from the audio object to the video object, the message signal indicating an audio buffer is in a predetermined condition, the audio buffer having buffered audio data provided by the audio object; and
(c) waiting a predefined period of time if the message signal was sent from the audio object, thereby helping to maintain synchronization between the audio object and the video object.

18. The method of claim 17, wherein the predetermined condition is when the audio buffer has an amount of the buffered audio data which is low.

19. The method of claim 18, wherein the value of the predefined period of time depends on how low is the amount of buffered audio data.

20. The method of claim 19, wherein if the amount of buffered audio data left in the audio buffer is approximately half of the capacity of the audio buffer, then the predefined period of time is approximately 25 milliseconds.

21. The method of claim 19, wherein if the amount of buffered audio data left in the audio buffer is approximately a quarter of the capacity of the audio buffer, then the predefined period of time is approximately 100 milliseconds.

22. The method of claim 19, wherein if the audio buffer is nearly empty, then the predefined period of time is approximately 200 milliseconds.

* * * * *